(12) United States Patent
Chen et al.

(10) Patent No.: US 7,967,118 B2
(45) Date of Patent: Jun. 28, 2011

(54) IMPACT ABSORBER DEVICE

(76) Inventors: Dai-heng Chen, Tokyo (JP); Hiroyuki Tanaka, Fukuoka (JP); Shigeyuki Haruyama, Fukuoka (JP); Hironobu Nisitani, Fukuoka (JP)

( * ) Notice: Subject to any disclaimer, the term of this patent is extended or adjusted under 35 U.S.C. 154(b) by 1127 days.

(21) Appl. No.: 11/661,036

(22) PCT Filed: Aug. 30, 2005

(86) PCT No.: PCT/JP2005/016178
§ 371 (c)(1),
(2), (4) Date: Feb. 26, 2007

(87) PCT Pub. No.: WO2006/025559
PCT Pub. Date: Mar. 9, 2006

(65) Prior Publication Data
US 2007/0251782 A1    Nov. 1, 2007

(30) Foreign Application Priority Data
Aug. 31, 2004   (JP) .................................. 2004-253349

(51) Int. Cl.
*F16F 7/12* (2006.01)

(52) U.S. Cl. ........................................ 188/376; 188/377
(58) Field of Classification Search ................... 188/371, 188/376, 377
See application file for complete search history.

(56) References Cited

FOREIGN PATENT DOCUMENTS

| JP | 49-001975 | | 1/1974 |
|---|---|---|---|
| JP | 2002-39245 | | 2/2002 |
| JP | 2004-100557 | | 4/2004 |
| JP | 2004-116564 | | 4/2004 |
| SU | 445776 | A * | 12/1974 |
| SU | 1285231 | A * | 1/1987 |
| SU | 1634862 | A * | 3/1991 |

* cited by examiner

*Primary Examiner* — Thomas J Williams
(74) *Attorney, Agent, or Firm* — Rabin & Berdo, PC

(57) ABSTRACT

An impact absorber device includes at least one first portion having a short tubular shape, and at least one second portion having a short tubular shape concentrically disposed in a stacked relationship with the first portion. The first portion and the second portion engage with each other at an engagement portion which is inclined with respect to a concentric axis of the first portion and the second portion. With this arrangement, impact energy is absorbed in the case of collision accidents of vehicles such as an automobile and trains, and the dropping accidents of lifts such as elevators.

7 Claims, 19 Drawing Sheets

FIG. 7
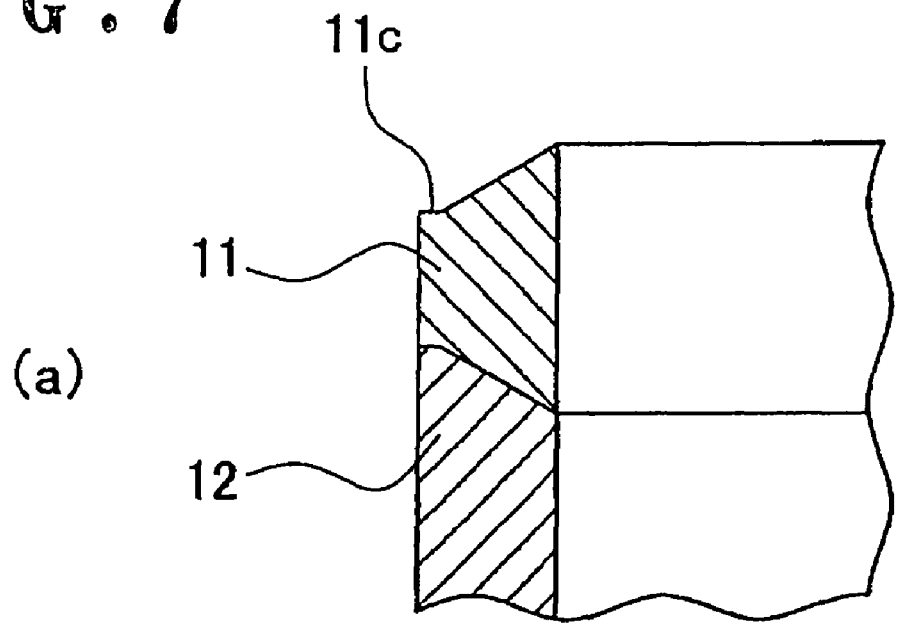
(a)
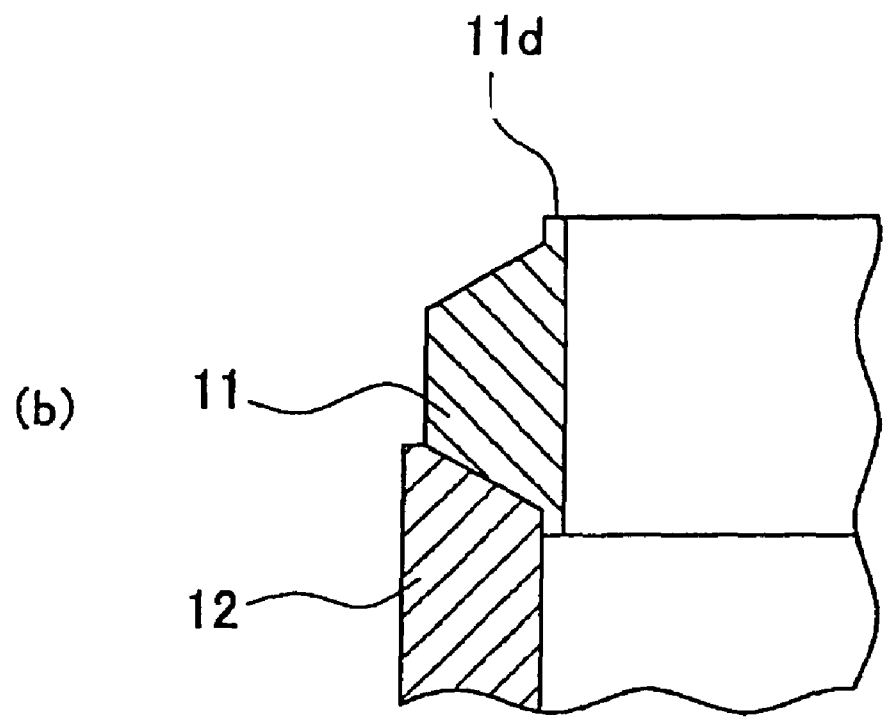
(b)

FIG. 14
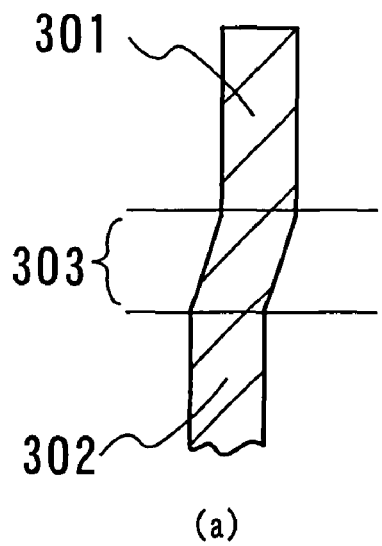
(a)
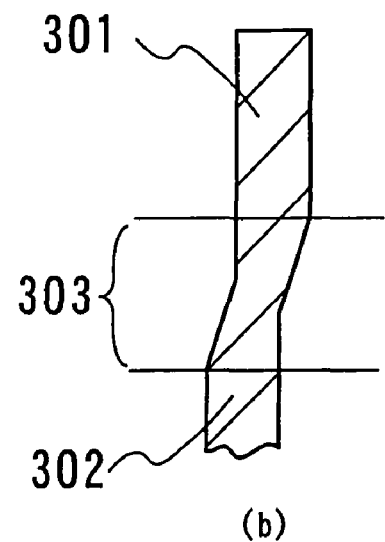
(b)
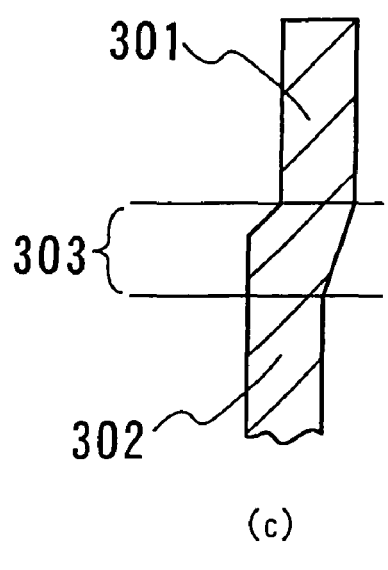
(c)
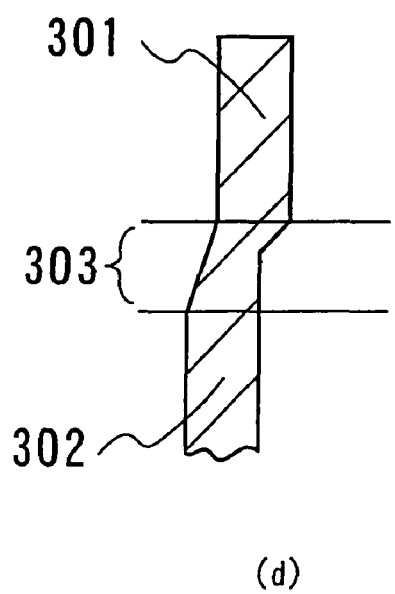
(d)

FIG.20

| IMPACT ABSORBER DEVICE | INNER DIAMETER (mm) | WALL THICKNESS (mm) | HEIGHT (mm) | WEIGHT (g) | ENERGY ABSORPTION EFFICIENCY (KJ/Kg) |
|---|---|---|---|---|---|
| CONVENTIONAL DEVICE USING BUCKLING | 50 | 2 | 178 | 300.1 | 13.0 |
| DEVICE OF FIRST EMBODIMENT | 40 | 7.5 | 83 | 233.8 | 79.1 |
| DEVICE OF THIRD EMBODIMENT | 35 | 4 | 50 | 73.2 | 62.1 |
| DEVICE OF FOURTH EMBODIMENT | 21.2 | 4 | 60 | 57.0 | 57.7 |

US 7,967,118 B2

IMPACT ABSORBER DEVICE

TECHNICAL FIELD

The present invention relates to a device for absorbing impact energy in the case of a collision accident of vehicles such as automobiles and trains, and drop accidents of lifts such as elevators.

BACKGROUND ART

An impact absorber device sometimes referred to as a "crash box" is installed on a front part of a chassis frame of a vehicle in order to absorb energy of a collision crush impact. The impact absorber device absorbs the impact energy by way of buckling deformation when a load of the impact applied thereto exceeds a predetermined level. Installation of this device thus ensures the safety of individuals in the vehicle.

In Japanese Patent Kokai No. 2002-39245, for example, such an impact absorber device made of aluminum alloy casting is disclosed.

This impact absorber device has a cylinder portion made of aluminum alloy casting, and the wall thickness of the tubular portion continuously or partially changes along an axial direction. With this configuration, the impact energy is effectively absorbed by performing plastic deformation in longitudinally alternating inward and outward corrugations along the axial direction of the tubular portion.

Japanese Patent Kokai No. 2004-100557 discloses another impact absorber device of which entire body is made of metal. This impact absorber device includes a tubular portion, flanges respectively provided on both sides of the tubular portion, and a reinforcing member formed around the tubular portion. The wall thickness of the tubular portion partially or entirely varies gradually from one side to the other.

There are other impact absorber devices which rely upon crack extension or deformation of a honeycomb element for absorbing the impact energy. An impact absorber device of crack extension type absorbs the impact energy by extending a crack which is triggered when a tapered member is pressed onto an end portion of the cylindrical element. An impact absorber device of a honeycomb element deformation type absorbs the impact energy by buckling and crashing a side wall of a honeycomb panel installed between flat plates.

Since the above mentioned conventional impact absorber devices rely on such unstable phenomena as buckling deformation and cracking extension, deformation mode (or deforming pattern) considerably changes even by slight difference in dimension, installation condition or constraint condition, which may occur during manufacturing and installation phases. Further, deformation mode is greatly influenced by the impact direction of the load at collision.

An impact absorber device of buckling type requires a longer body to absorb greater impact energy in the axial direction. This raises a concern that the longer body may cause Euler buckling during absorption of the impact energy. As a result, an absorbing element with the longer body may fail to function properly. Moreover, during the buckling deformation, the impact energy is absorbed by longitudinally alternating inward and outward corrugations as mentioned above, which generates oscillation in a load-to-length-change response. Accordingly, the entire element cannot be effectively used to absorb the impact energy.

An impact absorber device of crack extension type may vary its crack extension pattern depending on a trigger condition for the cracking such as a contact angle between the impact absorber device and a member to trigger crack in the device. Therefore, it may be very difficult to control the extension of the crack. An impact absorber device of a honeycomb element deformation type inherently has a complicated structure, and therefore it is very difficult to fabricate the device as expected and properly evaluate the performance of the device.

DISCLOSURE OF THE INVENTION

In consideration of the foregoing problems, it is an object of the present invention to provide an impact absorber device installed in a limited space so as to efficiently absorb impact energy in a stable manner.

An impact absorber device according to the present invention includes at least one first portion having a short tubular shape, and at least one second portion having a short tubular shape concentrically disposed in a stacked relationship with the first portion. The first portion and the second portion engage with each other at an engagement portion which is inclined with respect to a concentric axis of the first portion and the second portion.

The impact absorber device according to the present invention may be provided with the first portion having a small diameter and having a full peripheral sliding contact face at a top portion thereof, the second portion having a large diameter and having a full peripheral sliding contact face at a bottom portion thereof, the engagement portion of a truncated cone connecting the first portion and the second portion so that the full peripheral sliding contact faces are directed in opposite directions. The first portion, the second portion and the connection portion may constitute one unit. The impact absorber device may further include support elements for supporting one or a plurality of the unit(s) from both sides. The support element may have a sliding contact surface on a side facing the unit.

Each of the first portion and the second portion of the impact absorber device according to the present invention may have a short cylindrical shape. Radiuses of the cylindrical shapes of the first portion and the second portion respectively measured on the basis of the center of wall thickness thereof may be different from each other.

BRIEF DESCRIPTION OF THE DRAWINGS

FIG. 7 shows partial cross-sectional views of the first embodiment of the impact absorber device 10 which is provided with an engaging section;

FIG. 14 shows partial cross-sectional views illustrating modifications of a connection portion of the third embodiment of the present invention;

FIG. 20 is a table comparing the energy absorption efficiencies of various impact absorber devices.

DETAILED DESCRIPTION OF THE INVENTION

Embodiments of the present invention will be hereinafter described with reference to the drawings.

Figure 1:
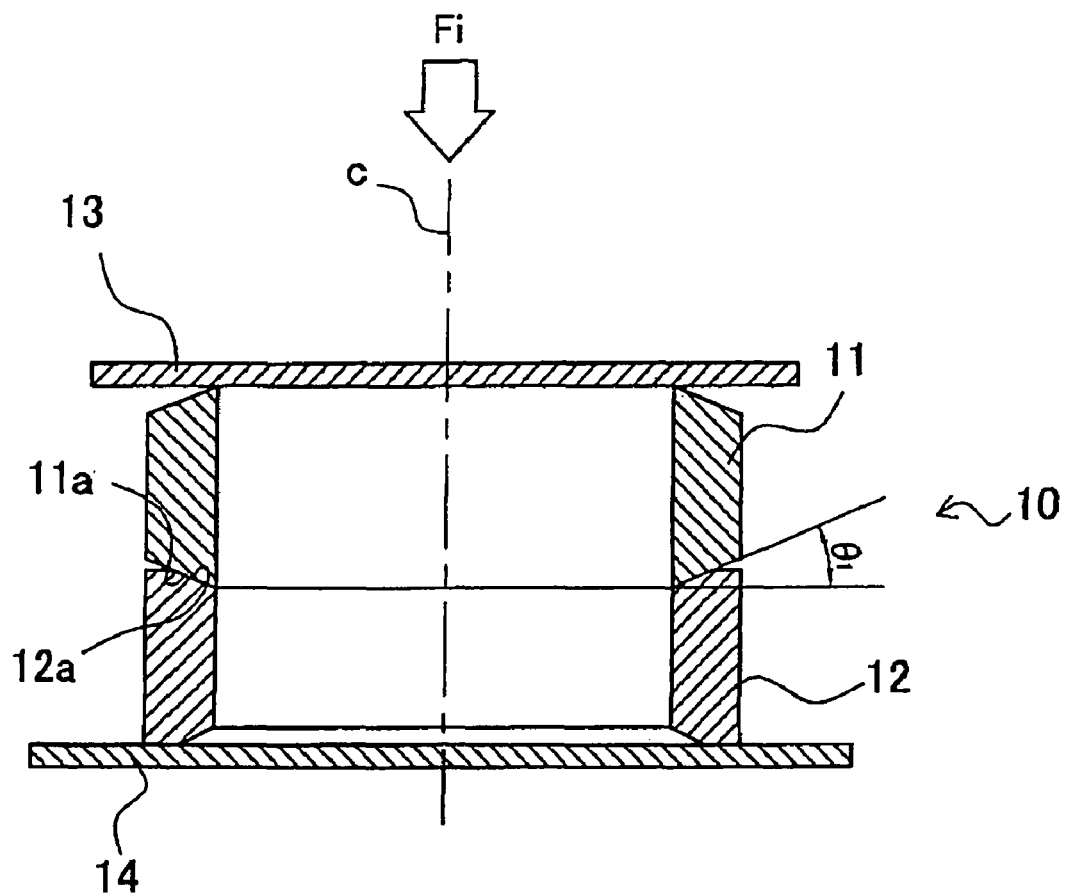
FIG. 1 is a cross-sectional view showing a first embodiment of an impact absorber device 10 according to the present invention.

FIG. 1 is a cross-sectional view of a first embodiment of an impact absorber device 10 according to the present invention.

The impact absorber device 10 includes a first element 11 having a short tubular shape and a second element 12 having a short tubular shape. The first element 11 and the second element 12 are concentrically stacked one on another when in use. When an impact load Fi is applied to the impact absorber device 10, the first element 11 is pressed and inserted into the second element 12. Accordingly, the first element 11 deforms to shrink in a radially inward direction, thereby decreasing its diameter. Simultaneously, the second element 12 deforms to expand in a radially outward direction, thereby increasing its diameter. As a result the impact energy is absorbed. The impact absorber device 10 is generally installed between rigid members such as rigid plates 13 and 14 as shown in FIG. 1.

The first element 11 may be made of metal such as stainless, aluminum alloy and magnesium alloy, or nonmetal such as ceramic, plastic, and so forth. The first element 11 has an inclined face 11a at the bottom portion facing the second element 12 so as to engage with the second element 12 when the first element 11 and the second element 12 are disposed in a stacked relationship. The first element 11 may have another inclined face 11a at the top portion of the first element 11, and in this case, two second elements 12 may be respectively stacked on top and bottom of the first element 11. The second element 12 has an inclined face 12a at the top portion thereof facing the first element 11 so as to engage with the first element 11 when the second element 12 and the first element 11 are disposed in a stacked relationship. The second element 12 may have another inclined face 12a at the bottom portion of the second element 12, and in this case, two first elements 11 may be respectively stacked on top and bottom of the second element 12. The second element 12 may be made of metal such as stainless, aluminum alloy and magnesium alloy, or nonmetal such as ceramic, plastic, and so forth. It is to be noted that the material of the second element 12 is not necessarily the same as that of the first element 11. Difference in material between the first element 11 and the second element 12 makes it possible to control the deformation where, for example, only one of the elements may be deformed when absorbing a specified impact energy.

The inclination angle of the inclined face 11a of the first element 11 with respect to a plane perpendicular to the central axis is the same as the inclination angle of the inclined face 12a of the second element 12 with respect to a plane perpendicular to the central axis, which is an angle of $\theta_1$. The angle $\theta_1$ is preferably within a range of 30° to 85°, and most preferably about 60°.

Figure 2:
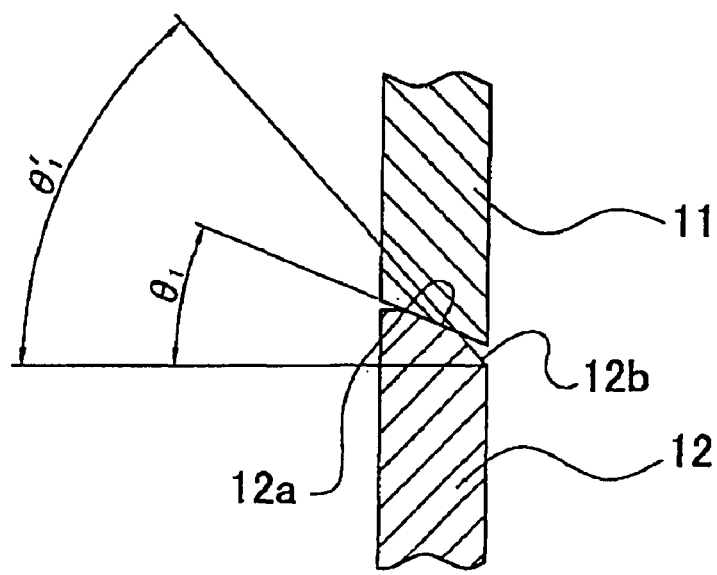
FIG. 2 is a partial cross-sectional view showing a modification of the first embodiment of the impact absorber device 10 according to the present invention.

The second element 12 may also have an additional inclined face at radially inside or outside of the inclined face 12a. An inclination angle of the additional inclined face with respect to a plane perpendicular to the central axis is different from the inclination angle of the inclined face 12a. With this arrangement, it may be possible to control an extent of the deformation and to stabilize the deformation during the expansion and shrink of the elements in a radial direction. FIG. 2 shows an example of such an additional inclined face 12b having an inclination angle of $\theta_1'$ that is formed radially inside of the inclined face 12a.

The impact absorber device 10 has, for example, the following dimensions: an outer diameter, inner diameter and height of the cylinder of the first element 11 are 40 mm, 32 mm and 12.4 mm, respectively, and an outer diameter, inner diameter and height of the cylinder of the second element 12 are 40 mm, 32 mm and 12.3 mm, respectively. The impact absorber device 10 may have other dimensions on condition that the height of the element is shorter than the buckling wavelength ($\lambda$) thereof so as to prevent local buckling (corrugation) and Euler buckling. The most preferable shape of the impact absorber device 10 has such a feature that that the diameter of each element measured based on the center of the wall thickness is greater than the height thereof. It should be noted that the above-described buckling wavelength ($\lambda$) depends on the shape of the cylinder, and is generally defined as a function of the wall thickness ratio t/R, where t is a wall thickness of the cylinder, and R is a radius of the cylinder measured based on the center of the wall thickness.

With this arrangement, it can be expected that the first element 11 and the second element 12 uniformly deform during the expansion and shrink in a radial direction without causing buckling deformation. In the following description, the above described shape having the feature of the height being shorter than the buckling wavelength thereof will be referred to as a "short tubular shape", and in particular the above described shape having a cylindrical form will be referred to as a "short cylindrical shape".

The forms of the first element 11 and the second element 12 are not limited to the short cylindrical shapes of which each cross-section is a circle as shown in FIG. 1. Alternatively, the first element 11 and the second element 12 may have short tubular shapes of which each cross-section is an ellipse or polygon.

Figure 3:
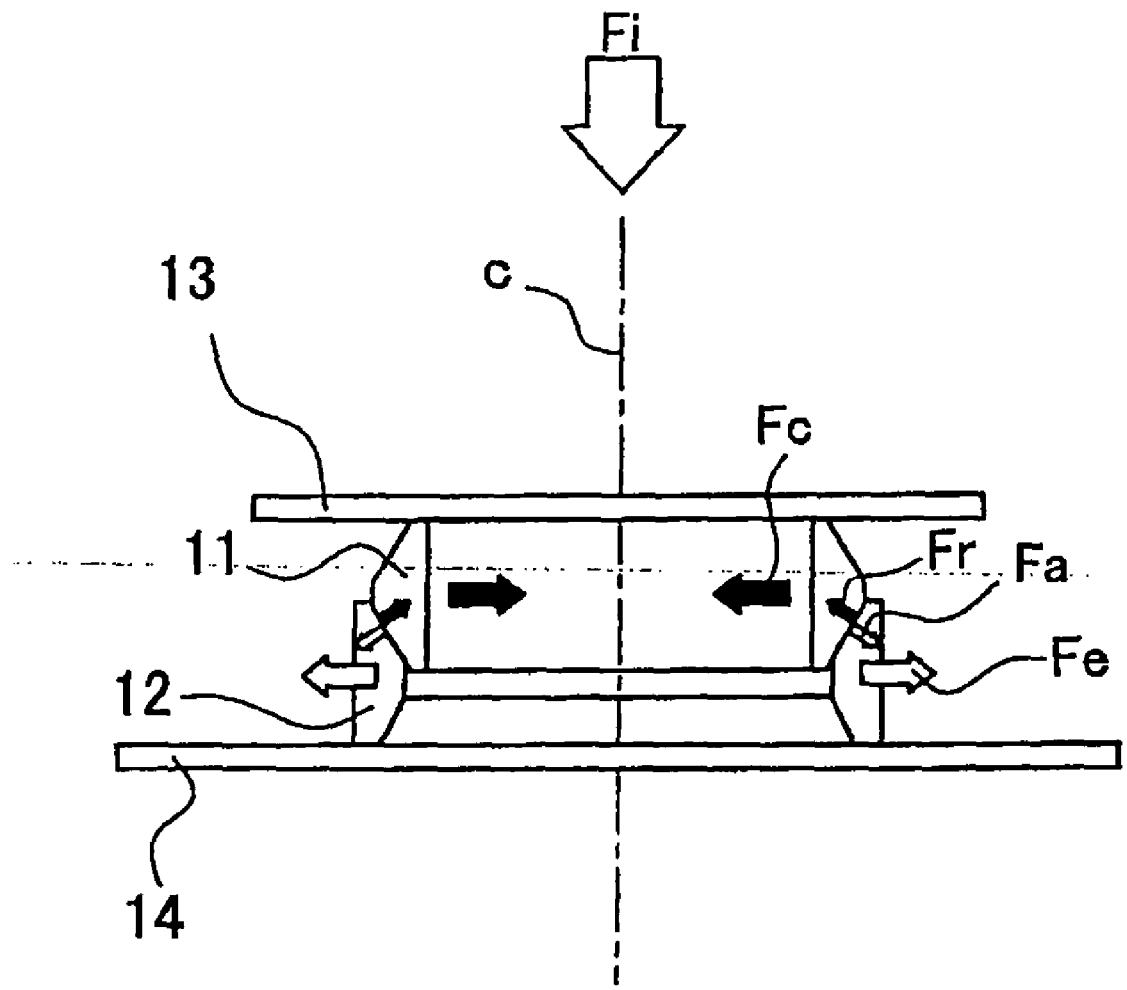
FIG. 3 is a diagram showing action and reaction forces applied to the impact absorber device 10 of FIG. 1.
Figure 4:
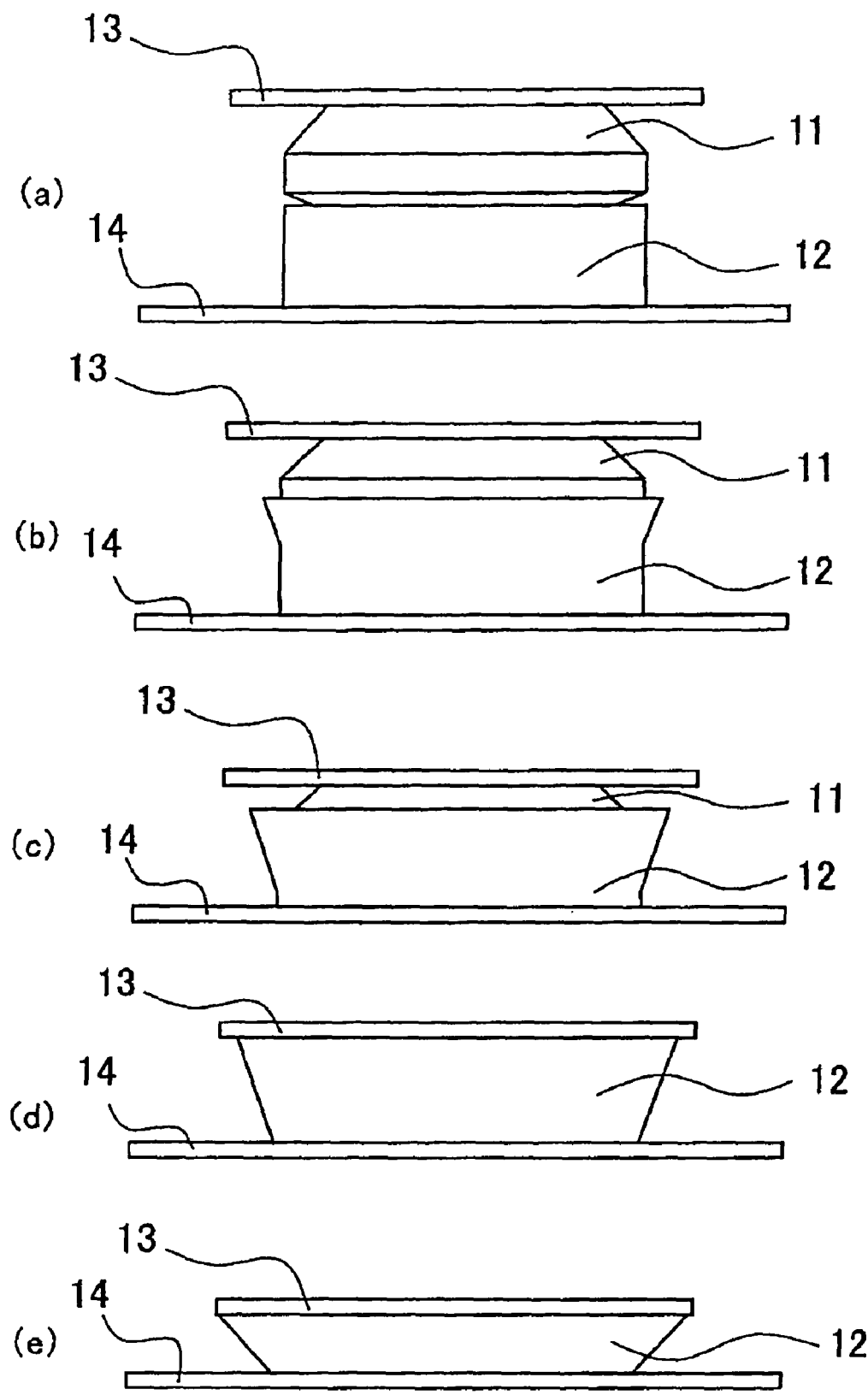
FIG. 4 shows diagrams illustrating how the impact absorber device 10 of FIG. 1 deforms while absorbing impact energy.

As shown in FIG. 3, when the impact absorber device 10 having the configuration of the first embodiment of the present invention receives an impact load Fi in a direction of the central axis C thereof, a force Fa is applied to the second element 12 in a direction perpendicular to the inclined face 12a. Simultaneously, a force Fr is applied to the first element 11 in a direction perpendicular to the inclined face 11a as a reaction force of the force Fa. Consequently, an outward force Fe which is a horizontal component of force Fa (outward component of force Fa which is perpendicular to the central axis C) is applied to the second element 12, thereby expanding the second element 12 in a radially outward direction. When the force Fe applied to the second element 12 exceeds a predetermined threshold, the second element 12 causes plastic, deformation after increasing its diameter, thereby absorbing the impact energy. On the other hand, an inward force Fc which is a horizontal component of the force Fr (inward component of the force Fr which is perpendicular to the central axis C) is applied to the first element 11, thereby shrinking the first element 11 in a radially inward direction. When a force Fc applied to the first element 11 exceeds a predetermined threshold, the first element 11 causes plastic deformation after decreasing its diameter, thereby absorbing the impact energy. The deformation of the first element 11 and the second element 12 is not buckling deformation but is expansion and shrink in a radial direction of the entire first element 11 and second element 12. FIG. 4A to FIG. 4E show a progress of this deformation. FIG. 4A is a state before the impact load is applied to the impact absorber device 10. FIG. 4B to FIG. 4E show the progress of deformation, and FIG. 4E shows the state when the deformation is completed. As shown in FIG. 4B to FIG. 4E, as the first element 11 is pressed into the hollow portion inside the second element 12, an upper part of the second element 12 is deformed to expand in a radially outward direction.

Figure 5:
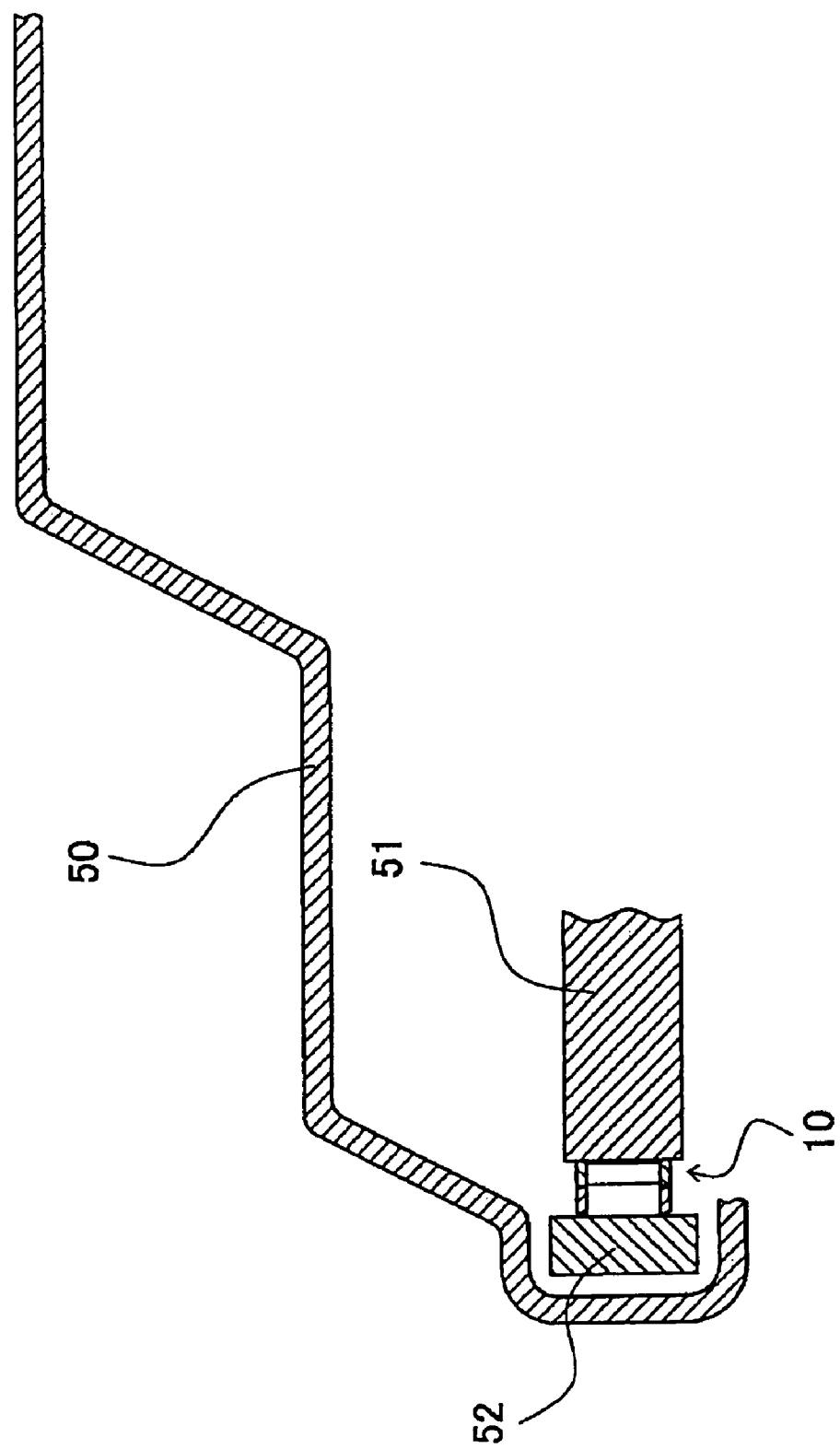
FIG. 5 is a schematic partial cross-sectional view showing the impact absorber device 10 of FIG. 1 installed on a front part of a chassis frame of an automobile.

FIG. 5 shows an example when the impact absorber device 10 of the first embodiment is installed in an automobile 50. Here 51 indicates a front part of a chassis frame, and 52 indicates a bumper. The impact absorber device 10 is installed between the front part of the chassis frame 51 and the bumper 52, and an impact energy received by the bumper 52 at collision is absorbed by the impact absorber device 10.

The impact absorber device 10 has been described on the basis of a pair of the first element 11 and the second element 12 with reference to FIG. 1, but the present invention is not limited to this configuration. The impact absorber device 10 may include a plurality of first elements and second elements. For example, the impact absorber device 10 may include two first elements 11 and one second element 12 as shown in FIG. 6A, one first element 11 and two second elements 12 as shown in FIG. 6B, or two first elements 11 and two second elements 12 as shown in FIG. 6C, which are stacked one on another.

Figure 6:
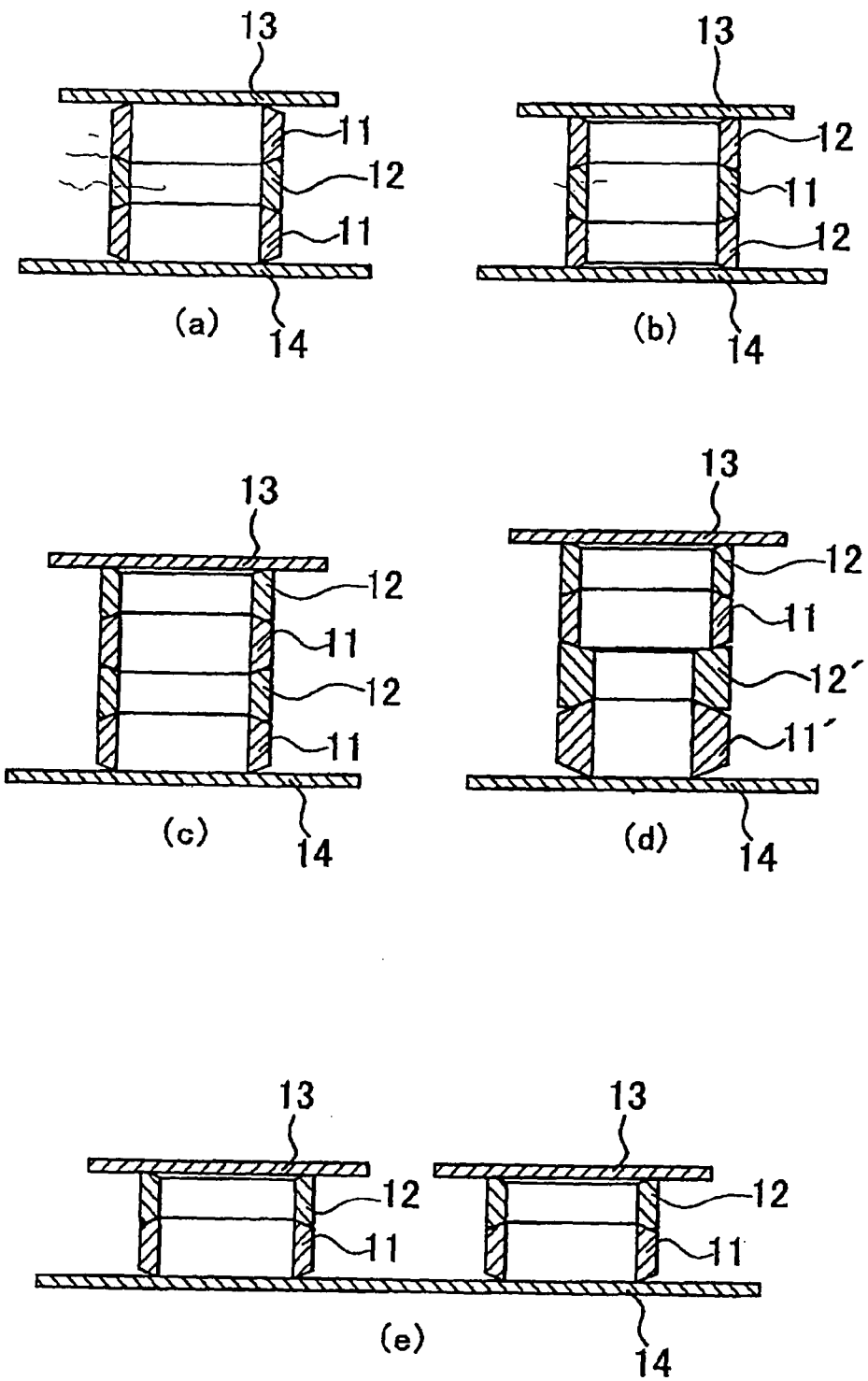
FIG. 6 shows cross-sectional views of modifications of the first embodiment using a plurality of the impact absorber devices 10 according to the present invention.

In FIG. 6A to FIG. 6C, two first elements 11 are the same to each other, and two second elements 12 are the same to each other. Alternatively, as shown in FIG. 6D, a first element 11 positioned near a plate 13 may have different shape or material from another first element 11' positioned far from the plate 13. In a similar manner, a second element 12 positioned near a plate 13 may have different shape or material from another second element 12' positioned far from the plate 13. This arrangement makes it possible for two pairs of elements of 11, 12 and 11', 12' to share different types of the impact. For example, energy from a weak crush impact is absorbed by one pair of elements of 11 and 12 positioned near the plate 13 and energy from a strong crush impact is absorbed by the other pair of elements 11' and 12' positioned far from the plate 13. Accordingly, installation of a plurality of pairs of devices with different shapes or materials in a vehicle ensures safety of individuals on board from collision at low speed to collision at high speed. Further, as shown in FIG. 6E, a plurality of sets of stacked first and second elements may be arranged horizontally. This arrangement makes it possible to disperse the impact load in absorbing the impact energy.

The impact absorber device 10 may be provided with fixing means so as not to cause a misalignment of the elements 11 and 12 which may be caused by unanticipated situations such as vibration after installation or impact in a diagonal direction. Such fixing means may be, for example, a cylindrical housing that encloses whole impact absorber device, or two panels for sandwiching the entire impact absorber device therebetween with a shaft passing through the central axis of the elements 11 and 12 for securing the panels to the device. The elements 11 and 12 may be glued to each other by adhesive, welding, soldering or the like to an extent where the functions of the impact absorber device are not interfered with. Further, the impact absorber device 10 may be provided with an engaging portion at the outermost circumference section or innermost circumference section so as to easily stack the elements 11 and 12 one on another. FIG. 7A and FIG. 7B show examples of such engagement sections 11c and 11d. FIG. 7A shows an engagement section 11c which is formed at the outermost circumference section of the first element 11. The engagement section 11c has an all around horizontal face of which width is about 1 to several mm on a side facing the second element 12. The first element 11 thus engages with the second element 12 by this all around horizontal face. FIG. 7B, on the other hand, shows an engagement section 11d, which is formed at the innermost circumference section of the first element 11. The engagement section 11d has an all around fitting portion of which width is about 1 to several mm on a side facing the second element 12. The all around fitting portion thus fits into the second element 12, and therefore the first element 11 engages with the second element 12. It should be noted that, in FIG. 7A, the inner and outer diameters of the first element 11 are the same as those of the second element 12, but in FIG. 7B, the inner diameter of the first element 11 is smaller than that of the second element 12, and the outer diameter of the first element 11 is smaller than that of the second element 12.

Figure 8:
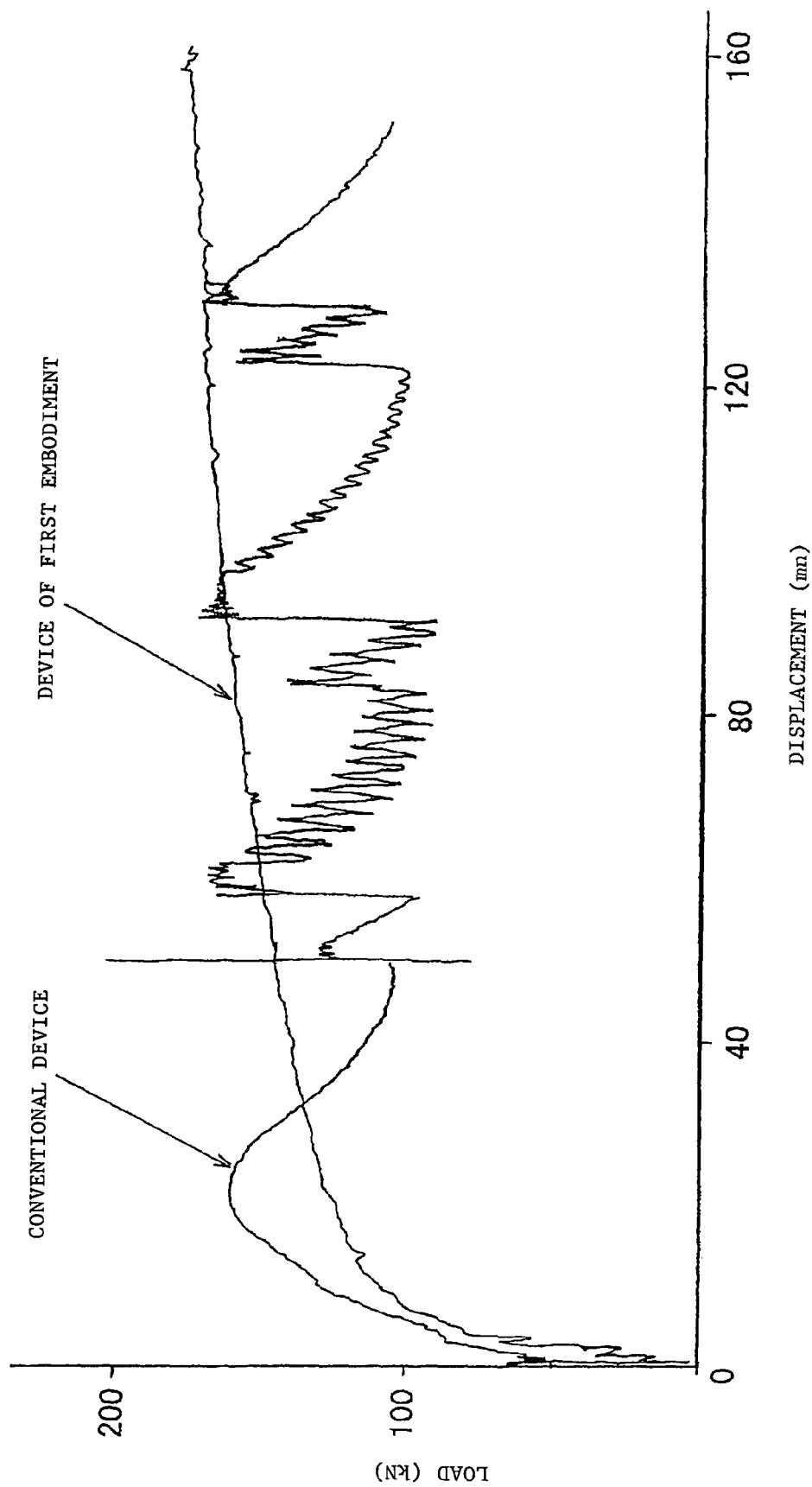
FIG. 8 is a diagram showing a relationship of the load and length-change of the impact absorber device 10 of FIG. 1.

FIG. 8 is a diagram showing the relationship of the load and length-change when the impact absorber device 10 of the first embodiment received an impact load and deformed, where the impact absorber device 10 of the first embodiment of the present invention is compared with a conventional impact absorber device. The abscissa in FIG. 8 shows a length-change of the impact absorber device which is a displacement of a contact point between the rigid body and the impact absorber device. The contact point was displaced due to deformation of the impact absorber device placed on a load cell as a result of a strike by the rigid body dropped thereon with a velocity of 40 km/hr. The ordinate in FIG. 8 shows a value indicated by the load cell at each location of the displacement.

The device of the first embodiment of the present invention in FIG. 8 had seven first elements 11 and eight second elements 12, which were wholly made of aluminum alloy. The inclination angles of the inclined faces were all 60°. The conventional device, on the other hand, had a cylinder shape made of aluminum alloy, of which wall thickness was 4 mm and the radius was 30 mm.

As FIG. 8 shows, the conventional impact absorber device had an oscillating load-to-length-change response after the initial peak load in absorbing the impact energy. In addition, each loop in the wave of the oscillating response had a finer waveform. The impact absorber device of the first embodiment, on the other hand, had an approximately uniform load-to-length-change response in absorbing the impact energy.

As described above, the impact absorber device 10 of the first embodiment of the present invention can absorb the impact energy in much more stable manner without generating unfavorable conditions such as an initial peak load, oscillation of the response, and fine waveform in each loop in the wave of the oscillation, which are generated in the conventional impact absorber device during the impact absorption. This is because the present invention primarily uses expansion and shrink phenomena in a radial direction which generates uniform deformation, without using the buckling phenomena which causes sudden deformation when a load exceeds a threshold level. Further, the deformation mode of the impact absorber device 10 of the first embodiment of the present invention is mainly attributed to the expansion and shrink of the elements in a radial direction, so that deformation mode is more stable as compared with the buckling phenomenon which inherently has an unstable feature. Therefore it becomes possible to suppress change in deformation mode caused by slight deviation of dimension, installation condition and constraint condition which may occur during manufacturing and installation phases. Moreover, since the impact absorber device 10 of the first embodiment absorbs the impact energy by uniformly deforming the entire elements, energy absorption efficiency, which is the total amount of absorbed energy divided by unit weight of the impact absorber device 10, is higher than that of the conventional impact absorber device. FIG. 20 shows a table comparing the energy absorption efficiencies of several impact absorber devices. The energy absorption efficiency of the first embodiment of the present invention is 79.1 KJ/kg, which is about six times as compared with a conventional impact absorber device which uses buckling deformation. Further, since the structure of the impact absorber device 10 is simple, design specification of the device such as peak load and load-to-length-change relationship can be easily evaluated, and the impact absorber device 10 can be easily manufactured with reduced cost.

The second embodiment of the present invention will be hereinafter described.

Figure 9:
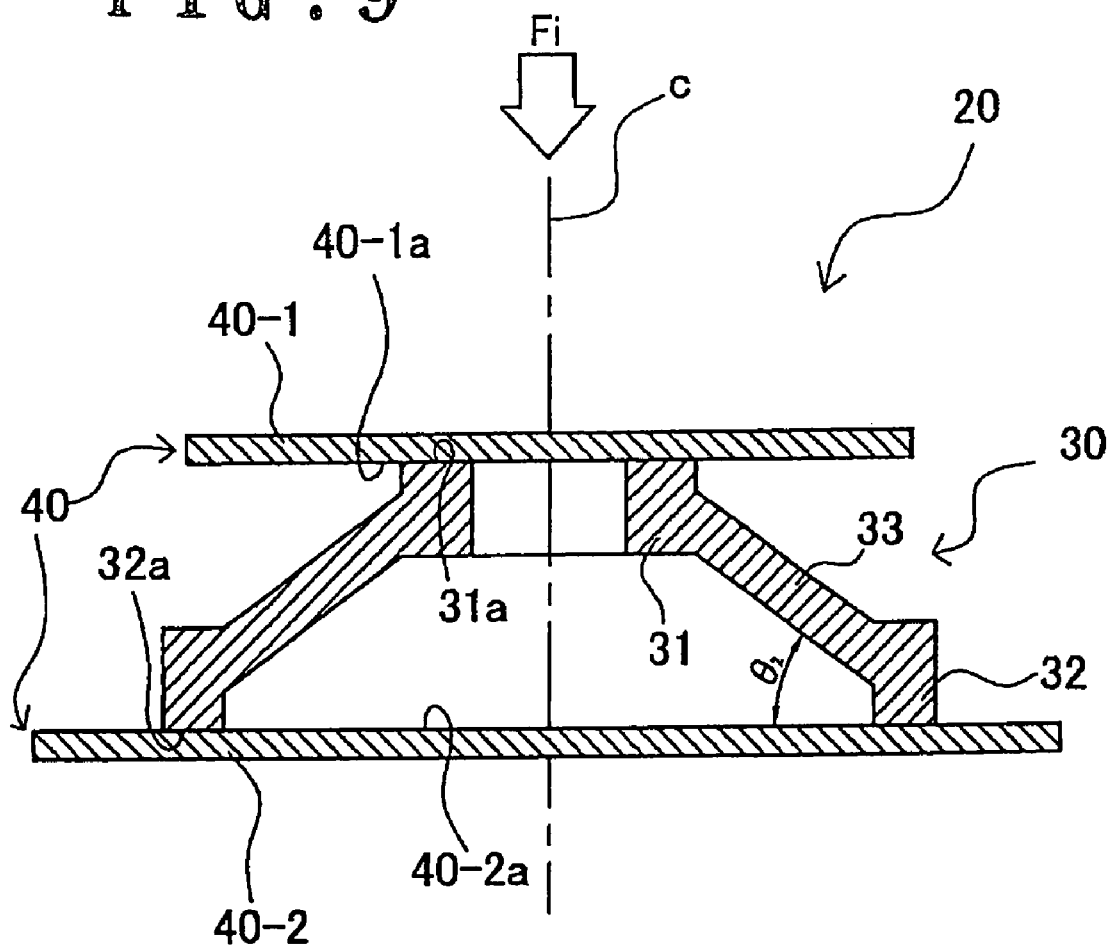
FIG. 9 is a cross-sectional view showing a second embodiment of an impact absorber device 20 according to the present invention.

FIG. 9 is a cross-sectional view of an impact absorber device 20 according to the second embodiment of the present invention.

The impact absorber device 20 includes a shock absorbing element (unit) 30 and support elements 40 which support the shock absorbing element 30 from both sides. The shock absorbing element 30 has a small diameter portion 31 in a short tubular shape, a large diameter portion 32 in a short tubular shape, and an intermediate portion 33 in a truncated cone shape for connecting these portions 31 and 32 concentrically. The small diameter portion 31, large diameter portion 32 and intermediate portion 33 are integrated into one piece. When the impact load Fi is applied to the shock absorbing element 30, the small diameter portion 31 is pushed into the large diameter portion 32 and is deformed to shrink in a radial direction. Simultaneously, the large diameter portion 32 is deformed to expand in a radial direction. Accordingly, the impact energy is absorbed. The impact absorber device 20 is made of metal such as stainless, aluminum alloy and magnesium alloy, or nonmetal such as ceramic, plastic, and so forth. Materials of these elements are not necessarily the same with respect to each other. The small diameter portion 31 has a full peripheral sliding contact face 31a at the top end, and the large diameter portion 32 has a full peripheral sliding contact face 32a at the bottom end. A top end of the truncated cone shape of the intermediate portion 33 is connected to the small diameter portion 31, and the bottom end thereof is connected to the large diameter portion 32, so that the full peripheral sliding contact faces 31a and 32a of the small diameter portion 31 and the large diameter portion 32 respectively face the opposite direction from each other. The support element 40 includes a top side support element 40-1 and a bottom side support element 40-2, both having the plate shapes. The top side support element 40-1 has a sliding face 40-1a on a surface facing the shock absorbing element 30 so as to slidably contact with the small diameter portion 31. The bottom side support element 40-2, on the other hand, has a sliding face 40-2a on a surface facing the shock absorbing element 30 so as to slidably contact with the large diameter portion 32.

The inclination angle between the side face of the truncated cone and the sliding face of the bottom side support element is defined as $\theta_2$, and this inclination angle $\theta_2$ is preferably within a range of 5° to 60°, and most preferably about 30°.

The shock absorbing element 30 has, for example, the following dimension: an outer diameter, inner diameter and the height of the cylinder of the small diameter portion 31 are 28 mm, 20 mm and 6 mm, respectively, and an outer diameter, inner diameter and the height of the cylinder of the large diameter portion 32 is 56 mm, 48 mm and 6 mm, respectively. An overall height of the shock absorbing element 30 with the intermediate portion 33 connecting these portions is 15 mm. The shock absorbing element 30 may have other dimensions on condition that the height of the small diameter portion 31 is shorter than the buckling wavelength ($\lambda$) thereof and the height of the large diameter portion 32 is shorter than the buckling wavelength ($\lambda$) thereof. With this arrangement, it can be expected that the small diameter portion 31 and large diameter portion 32 uniformly deform during expansion or shrink in a radial direction without causing buckling deformation.

The forms of the small diameter portion 31 and large diameter portion 32 are not limited to the short cylindrical shapes of which each cross-section is a circle as shown in FIG. 9. Alternatively, the small diameter portion 31 and large diameter portion 32 may have short tubular shapes of which each cross-section is an ellipse or polygon.

Figure 10:
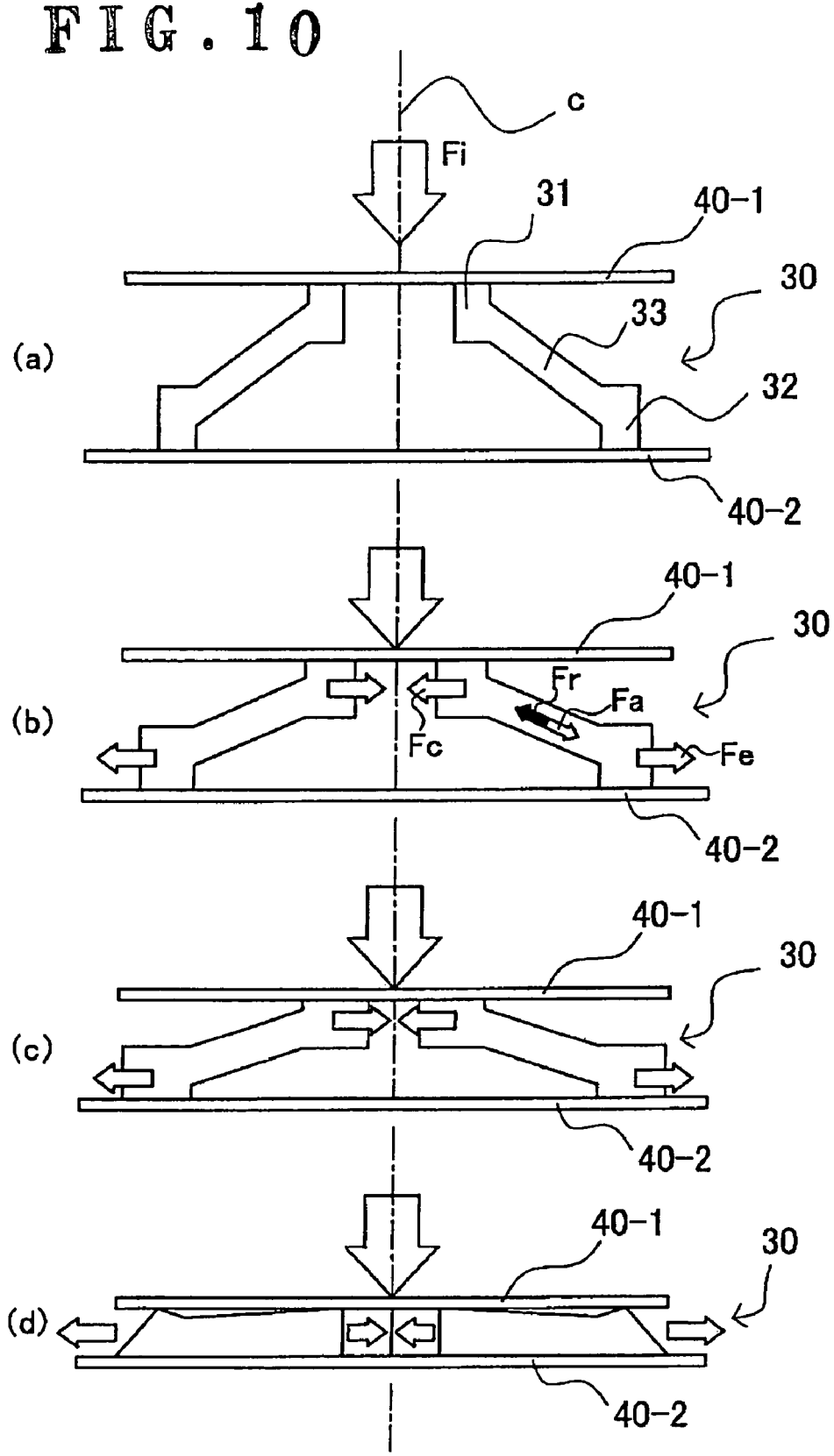
FIG. 10 are diagrams showing action and reaction forces applied to a shock absorbing element 30 of the impact absorber device 20 of FIG. 9, and illustrating how the shock absorbing element 30 deforms while absorbing impact energy.

With this configuration, when the impact absorber device 20 receives an impact load Fi in a direction of the central axis C thereof as shown in FIG. 10B, a force Fa is applied to the large diameter portion 32 from the intermediate portion 33. Simultaneously, the force Fr is applied to the small diameter portion 31 from the intermediate portion 33 as a reaction force of the force Fa. Consequently, an outward force Fe which is a horizontal component of the force Fa (outward component of the force Fa which is perpendicular to the central axis C) is applied to the large diameter portion 32, thereby expanding the large diameter portion 32 in a radially outward direction while the full peripheral sliding face 32a thereof slides on the sliding face 40-2a of the bottom side support element 40-2. When the force Fe applied to the large diameter portion 32 exceeds a predetermined threshold, the large diameter portion 32 causes plastic deformation after increasing its diameter, thereby absorbing the impact energy. On the other hand, an inward force Fc which is a horizontal component of the force Fr (inward component of the force Fr which is perpendicular to the central axis C) is applied to the small diameter portion 31, thereby shrinking the small diameter portion 31 in a radially inward direction while the full peripheral sliding face 31a slides on the sliding face 40-1a of the top side support element 40-1. When the force Fc applied to the small diameter portion 31 exceeds a predetermined threshold, the small diameter portion 31 causes plastic deformation after decreasing its diameter, thereby absorbing the impact energy. The deformation of the small diameter portion 31 and large diameter portion 32 is not buckling deformation but is deformation by compression and expansion/shrink in a radial direction of the entire small diameter portion 31 and large diameter portion 32, and by the folding of the intermediate portion 33. FIG. 10A to FIG. 10D show a progress of this deformation. FIG. 10A is a state before the impact load is applied to the impact absorber device 20. FIG. 10B to FIG. 10D show the progress of the deformation, and FIG. 10D shows the state when the deformation is completed. AS shown in FIG. 10A to FIG. 10D, as deformation progresses, the heights of the small diameter portion 31 and large diameter portion 32 decreases due to compression, and the wall thicknesses of the small diameter portion 31 and large diameter portion 32 increase. As readily understood from FIG. 10D, when the deformation completes, the small diameter portion 31 is inserted into a hollow portion radially inside the large diameter portion 32, so that the entire shock absorbing element 30 becomes substantially flat.

Figure 11:
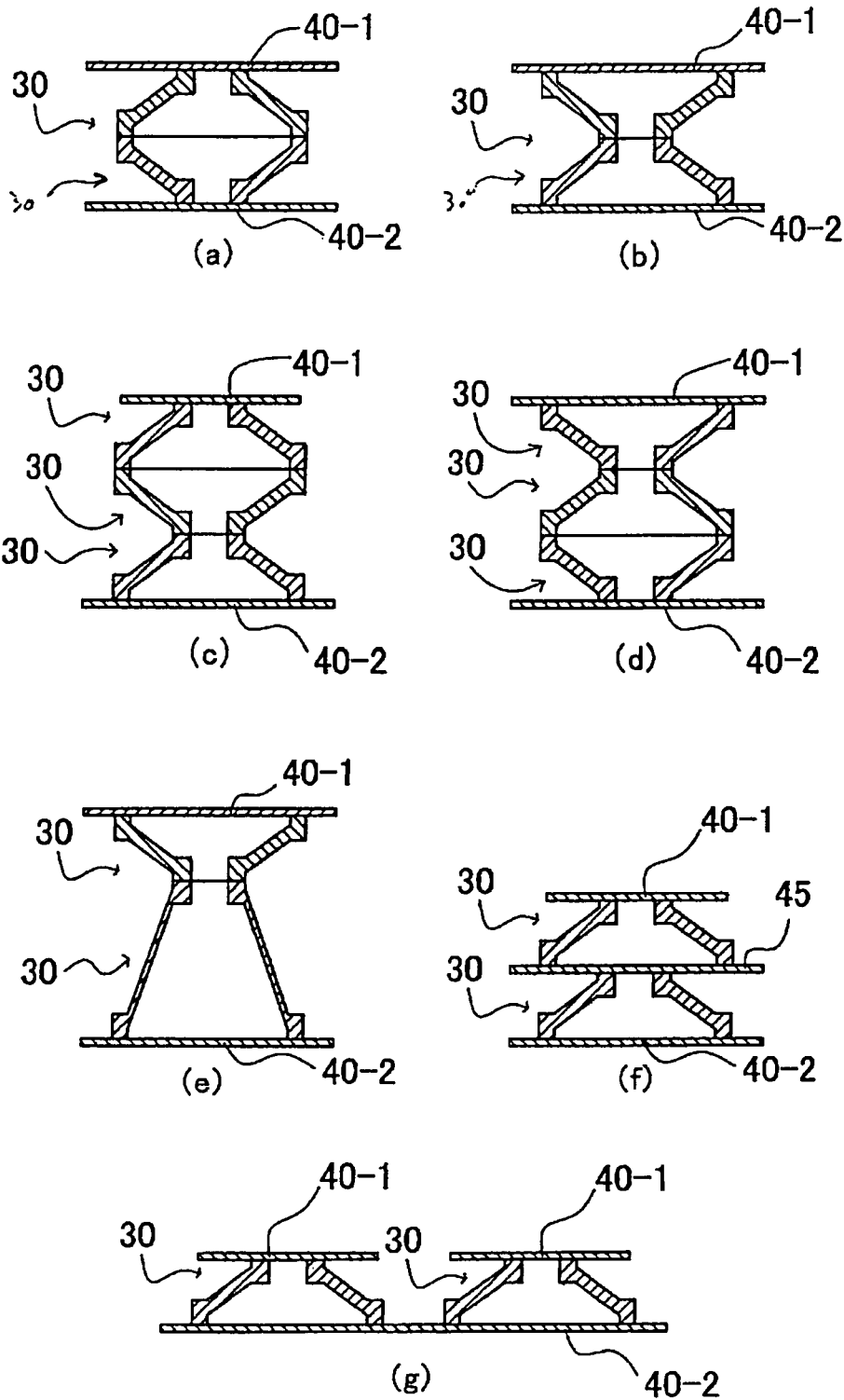
FIG. 11 shows cross-sectional views illustrating a modification of the second embodiment of the impact absorber device 20 in which a plurality of shock absorbing elements 30 are used.

The impact absorber device 20 has been described on the basis of one shock absorbing element 30 supported by the support element 40, but the present invention is not limited to this configuration. The impact absorber device 20 may include two or more shock absorbing elements 30 which are vertically stacked one on another as shown in FIGS. 11A, 11B, 11C and 11D. When a plurality of shock absorbing elements are used, the shock absorbing elements may have different shapes and materials as shown in FIG. 11E. This arrangement makes it possible for the different shock absorbing elements to share different type of the impact. For example, energy from a weak crush impact is absorbed by one shock absorbing element 30 positioned near a supporting element 40-1 and energy from a strong crush impact is absorbed by the other shock absorbing element 30' positioned far from the supporting element 40-1. Accordingly, installation of a plurality of shock absorbing elements with different shapes or materials in a vehicle ensures safety of individuals on board from collision at low speed to collision at high speed. Further, even though a plurality of the shock absorbing elements 30 are arranged such that a small diameter portion 31 of one element faces a small diameter portion 31 of the other, and a large diameter portions 32 of one element faces a large diameter portions 32 of the other as in FIGS. 11A to 11F, the shock absorbing elements 30 may be arranged in a different manner. Specifically, as shown in FIG. 11F, a plurality of shock absorbing elements 30 may be stacked one on another such that the small diameter portion 31 faces the large diameter portion 32 via a sliding element 45 with sliding faces on both sides. In other words, a plurality of shock absorbing elements 30 may be stacked in the same direction. Moreover, a plurality of shock absorbing elements 30 may be arranged horizontally as shown in FIG. 11G. This arrangement makes it possible to disperse the impact load in absorbing the impact energy.

The impact absorber device 20 may by provided with fixing means so as not to cause a misalignment of the elements which may be caused by unanticipated situations such as vibration after installation or by impact in a diagonal direction. Such fixing means may be, for example, a cylindrical housing that encloses whole impact absorber device, or a shaft for securing the support element 40 by passing through the central axis of the elements. The elements may be glued to each other by adhesive, welding, soldering or the like to an extent where the functions of the impact absorber device are not interfered with.

Figure 12:
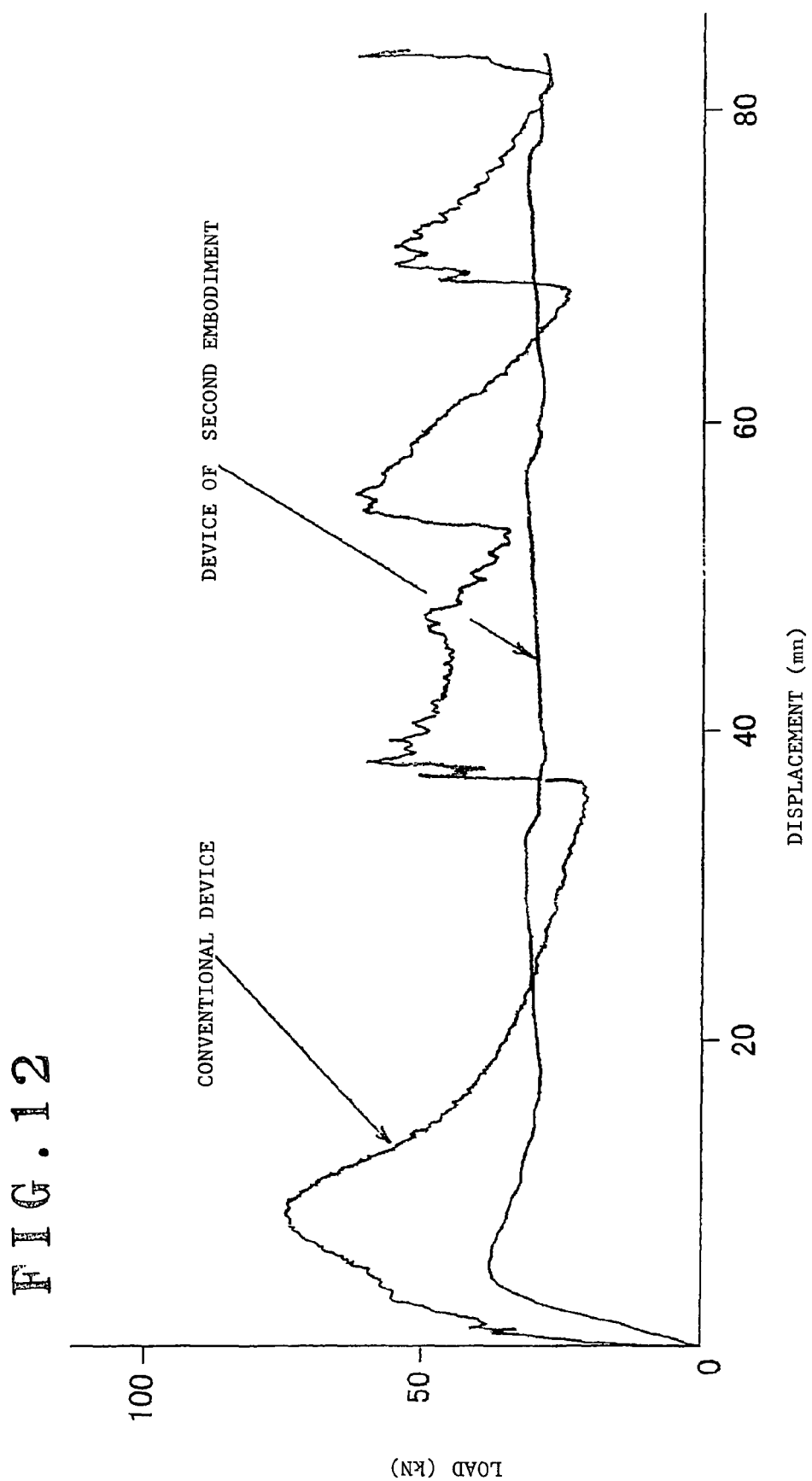
FIG. 12 is a diagram showing a relationship of the load and length-change of the shock absorbing element 30 of the impact absorber device 20 of FIG. 9.

FIG. 12 is a diagram showing the relationship of the load and length-change when the impact absorber device 20 of the second embodiment of the present invention received an impact load and deformed, where the impact absorber device 20 of the second embodiment of the present invention is compared with a conventional impact absorber device. The relationship of the abscissa and ordinate in FIG. 12 is similar to that in FIG. 8.

The device of the present invention in FIG. 12 had eight elements 30, which were arranged such that small diameter portions 31 were faced to each other and large diameter portions 32 were faced to each other. Materials of the devices were wholly aluminum alloy. The conventional device, on the other hand, had a cylinder shape made of aluminum alloy, of which wall thickness was 2 mm and the radius was 40 mm.

As FIG. 12 shows, the conventional impact absorber device had an oscillating load-to-length-change response after the initial peak load in absorbing the impact energy. In addition, each loop in the wave of the oscillating response had a finer waveform. The impact absorber device of the second embodiment, on the other hand, had an approximately uniform load-to-length-change response in absorbing the impact energy.

As described above, the impact absorber device 20 of the second embodiment of the present invention can absorb the impact energy in much more stable manner without generating unfavorable conditions such as an initial peak load, oscillating of the load, and fine waveform in each loop in the wave of the oscillating load, which are generated in the conventional impact absorber device during the impact absorption. This is because the present invention primarily uses expansion and shrink phenomena in a radial direction which generates uniform deformation, without using the buckling phenomena which causes sudden deformation when a load exceeds a threshold level. Further, the deformation mode of the impact absorber device 20 of the second embodiment of the present invention is mainly attributed to the expansion and shrink of the large diameter portion and small diameter portion in a radial direction, and to the folding of the intermediate portion, so that deformation mode is more stable as compared with the buckling phenomena which inherently has an unstable feature. Therefore it becomes possible to suppress change in deformation mode caused by slight deviation of dimension, installation condition and constraint condition which may occur during manufacturing and installation phases. Moreover, since the impact absorber device 20 of the second embodiment absorbs the impact energy by uniformly deforming the entire small diameter portion and large diameter portion, energy absorption efficiency, which is the total amount of absorbed energy divided by unit weight of the impact absorber device 20, is higher than that of the conventional impact absorber device. Further, since the structure of the impact absorber device 20 is simple, design specification of the device such as peak load, load-to-length-change relationship and other design values can be easily evaluated, and the impact absorber device 20 can be easily manufactured with reduced cost. Furthermore, since the impact absorber device of the second embodiment is integrally formed as one unit, it becomes possible to cover various load displacements and to easily control various energy absorptions. Furthermore, since the impact absorber device of the second embodiment has no relative sliding portion between the expanding element and shrinking element owing to the integrally formed structure, which although is necessary for the impact absorber device of the first embodiment, it becomes possible for the impact absorber device of the second embodiment to provide highly rigid property and resistance property against bending, shearing, vibration, and so forth, and it makes easier to install the device in a necessary location.

The third embodiment of the present invention will be hereinafter described.

Figure 13:
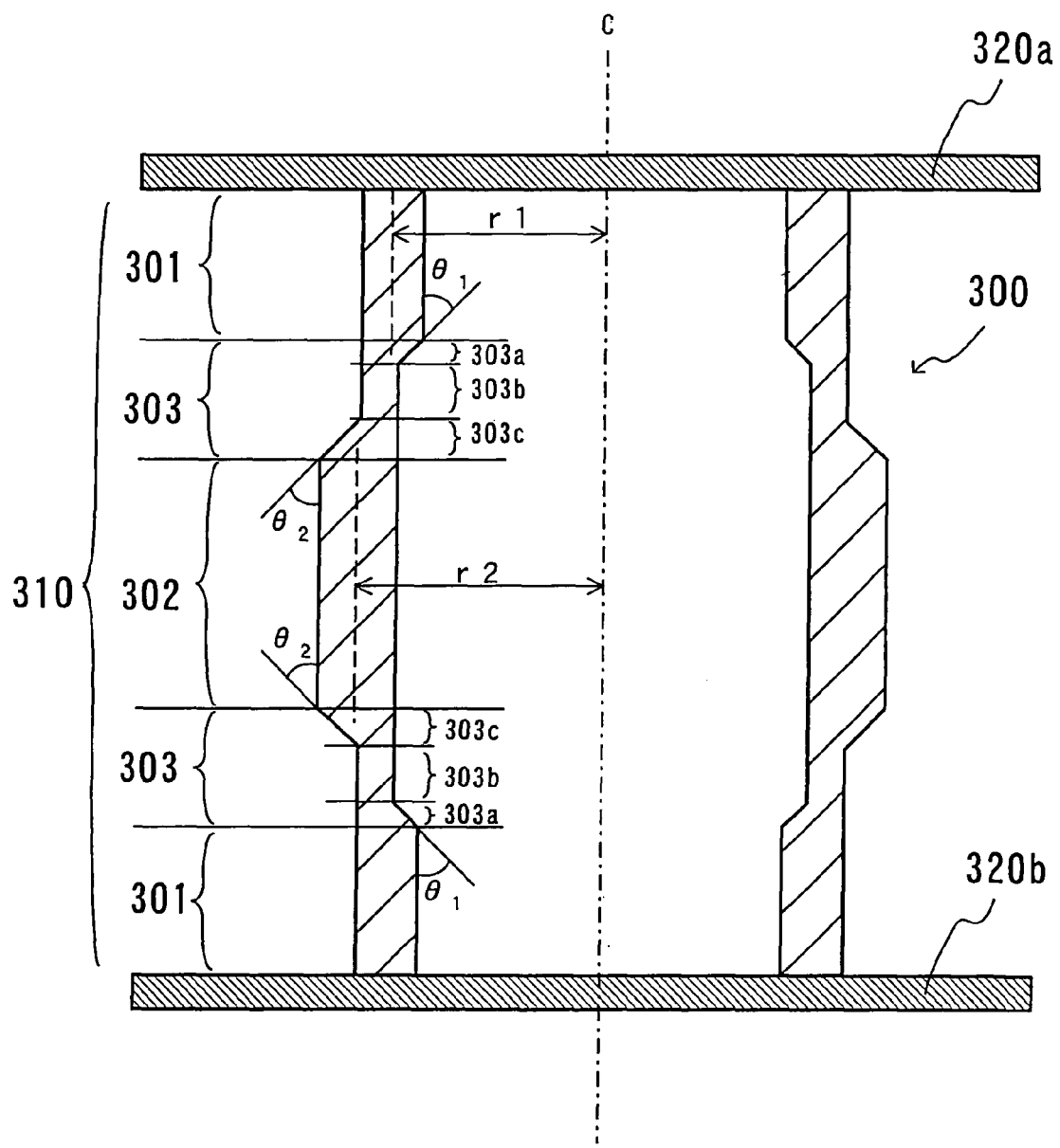
FIG. 13 is a cross-sectional view showing a third embodiment of an impact absorber device 300 according to the present invention.

FIG. 13 is a cross-sectional view of a third embodiment of an impact absorber device 300 according to the present invention.

The impact absorber device 300 of this embodiment includes a unit 310 which is integrally formed from two first portions 301 each having a short cylindrical shape 301, one second portion 302 having a short cylindrical shape, and two connection portions 303. Specifically, one second portion 302 is concentrically disposed between two first portions 301, and the connection portion 303 is provided between the first portion 301 and the second portion 302. The inner diameter of the first portion 301 is smaller than that of the second portion 302, and the outer diameter of the first portion 301 is smaller than that of the second portion 302. In other words, the radius r1 of the cylinder of the first portion 301 measured on the basis of the center of its wall thickness is smaller than the radius r2 of the cylinder of the second portion 302 measured on the basis of the center of the wall thickness. In order to form this arrangement, the connection portion 303 has an inclined portion which is inclined with respect to the concentric axis C of the unit 310. In embodiment of the unit 310 shown in FIG. 13, each connection portion 303 has two inclined portions 303a and 303c. A straight portion 303b is provided between these two inclined portions 303a and 303c, but this straight portion 303b can be omitted. FIG. 14A to FIG. 14D are partial cross-sectional views showing modifications of the connection portion 303 having no straight portion 303b. The inclination angles of the inclined portions 303a and 303c with respect to the concentric axis C are $\theta_1$ and $\theta_2$ respectively, and these angles are both 45°, for example. It should be noted that these angles are not limited to this value, but are determined to obtain optimum values considering design parameters such as design impact load, specified extent of energy absorption, size of the impact absorber device and its material. The angles $\theta_1$ and $\theta_2$ need not be the same value. The impact absorber device 300 is generally installed between rigid members such as rigid plates 320a and 320b as shown in FIG. 13.

The unit 310 of the impact absorber device 300 may be made of metal such as stainless, aluminum alloy and magnesium alloy, or nonmetal such as ceramic, plastic, and so forth. The impact absorber device 300 has, for example, the following dimensions: inner diameter, wall thickness and height of the first portion 301 are 30 mm, 4 mm and 10 mm, respectively, and inner diameter, wall thickness and height of the second portion 302 are 32 mm, 4 mm and 20 mm, respectively. The overall height of the unit is 50 mm. The impact absorber device 300 may have other dimensions on condition that each height of the first portion 301 and second portion 302 is shorter than the buckling wavelength ($\lambda$) thereof. With this arrangement, the first portion 301 and second portion 302 are compressed in the axial direction while maintaining the symmetrical deformation with respect to the central axis C without causing buckling deformation.

When the impact absorber device 300 receives an impact load in a direction of the central axis C thereof, a compressing force to compress the first portion 301 in the axial direction and a shrinking force to shrink the first portion 301 in a radially inward direction are applied to the first portion 301 by the connection portion having an inclined portion. When a force applied to the second portion 302 exceeds a predetermined threshold, the first portion 301 causes plastic deformation, thereby absorbing the impact energy. On the other hand, a compressing force to compress the second portion 302 in the axial direction and an expanding force to expand the second portion 302 in a radially outward direction are applied to the second portion 302 by the connection portion having the inclined portion. When a force applied to the second portion 302 exceeds a predetermined threshold, the second portion 302 causes plastic deformation, thereby absorbing the impact energy.

Figure 15:
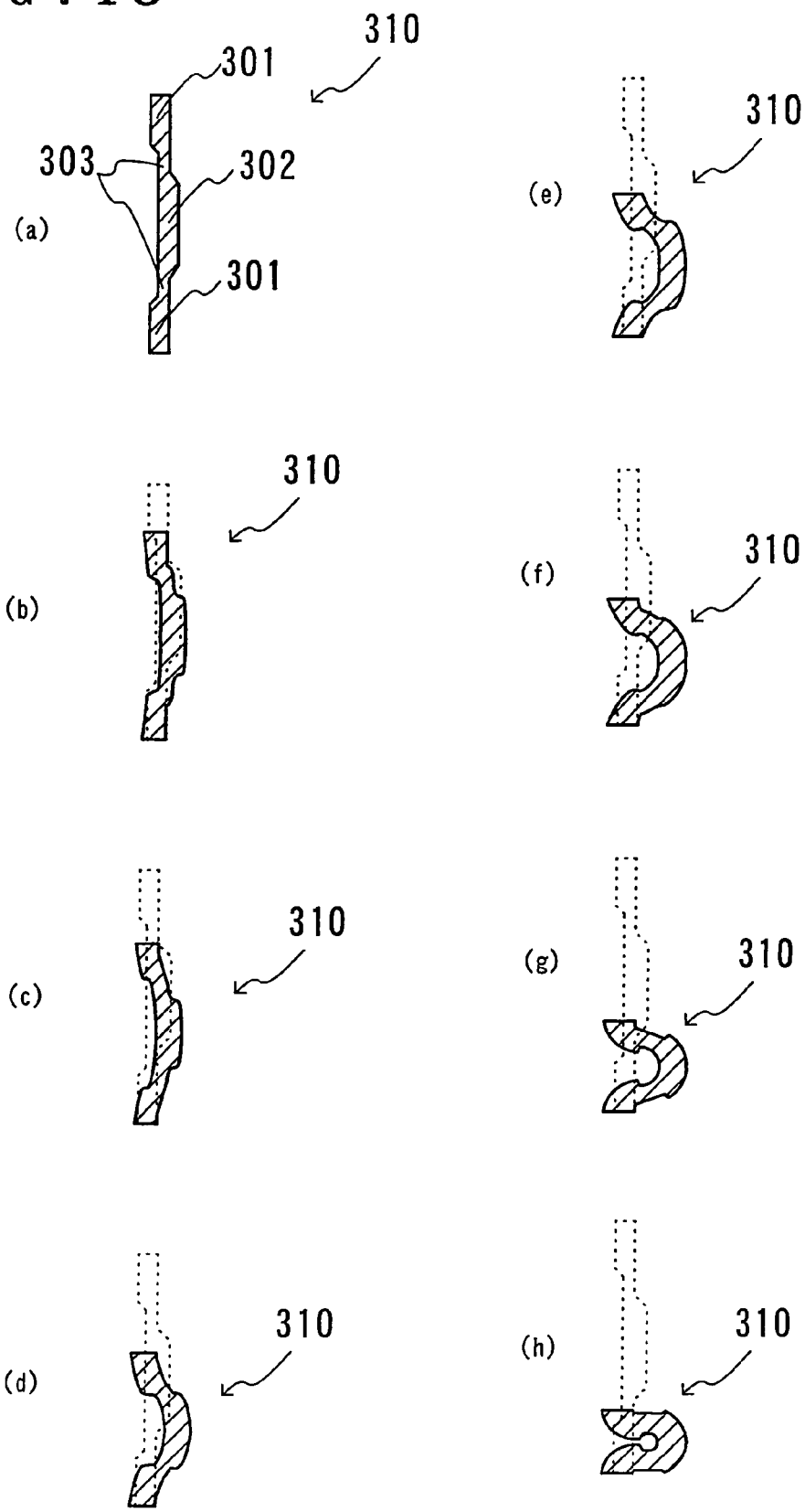
FIG. 15 shows partial cross-sectional views illustrating how the impact absorber device 300 of FIG. 13 deforms while absorbing impact energy.

The deformation of the first portion 301 and second portion 302 is not buckling deformation, but is expansion and shrink in a radial direction. FIG. 15A to FIG. 15H show a progress of this deformation. FIG. 15A to FIG. 15H show only one side in the cross-sectional view of one unit. In each cross-sectional view, an original shape of the unit before deformation is shown by a dotted line so as to visualize an extent of the deformation. FIG. 15A is a state before the impact load is applied to the impact absorber device 300. FIG. 15B to FIG. 15H show the progress of deformation, and FIG. 15H shows the state when deformation is completed. As understood from FIG. 15A to FIG. 15H, as deformation progresses, compression of the first portion 301 causes increase of the wall thickness and shrink of the first portion 301 in a radially inward direction. Simultaneously, compression of the second portion 302 causes increase of the wall thickness and expand of the second portion 302 in a radially outward direction. In addition, as the deformation progresses, the connection portion 303 is folded. It should be noted that, in the first portion 301, the inner diameter becomes somewhat smaller as deformation progresses, but the outer diameter hardly changes. In this case, the shearing stress in the radial direction at both end faces of the unit is substantially zero. Accordingly, appropriately designed shape of the unit 310 makes it possible to control the deformation mode at both end faces of the unit. In the case shown in FIG. 15, for example, the change of outer diameter at both end faces of the unit is suppressed, so that the outer circumference portion at both ends of the impact absorber device 300 can be secured to the rigid plates 320 by securing means such as adhesive, welding and soldering, while substantially ensuring the impact absorption performance. Therefore when a plurality of units are used, as mentioned later, impact absorption performance is hardly interfered with, even if adjacent units are completely integrated to each other. This means that when one impact absorber device is fabricated by connecting a plurality of units 310, the impact absorber device can be securely installed at an installation location by merely securing both ends to rigid bodies.

Figure 16:
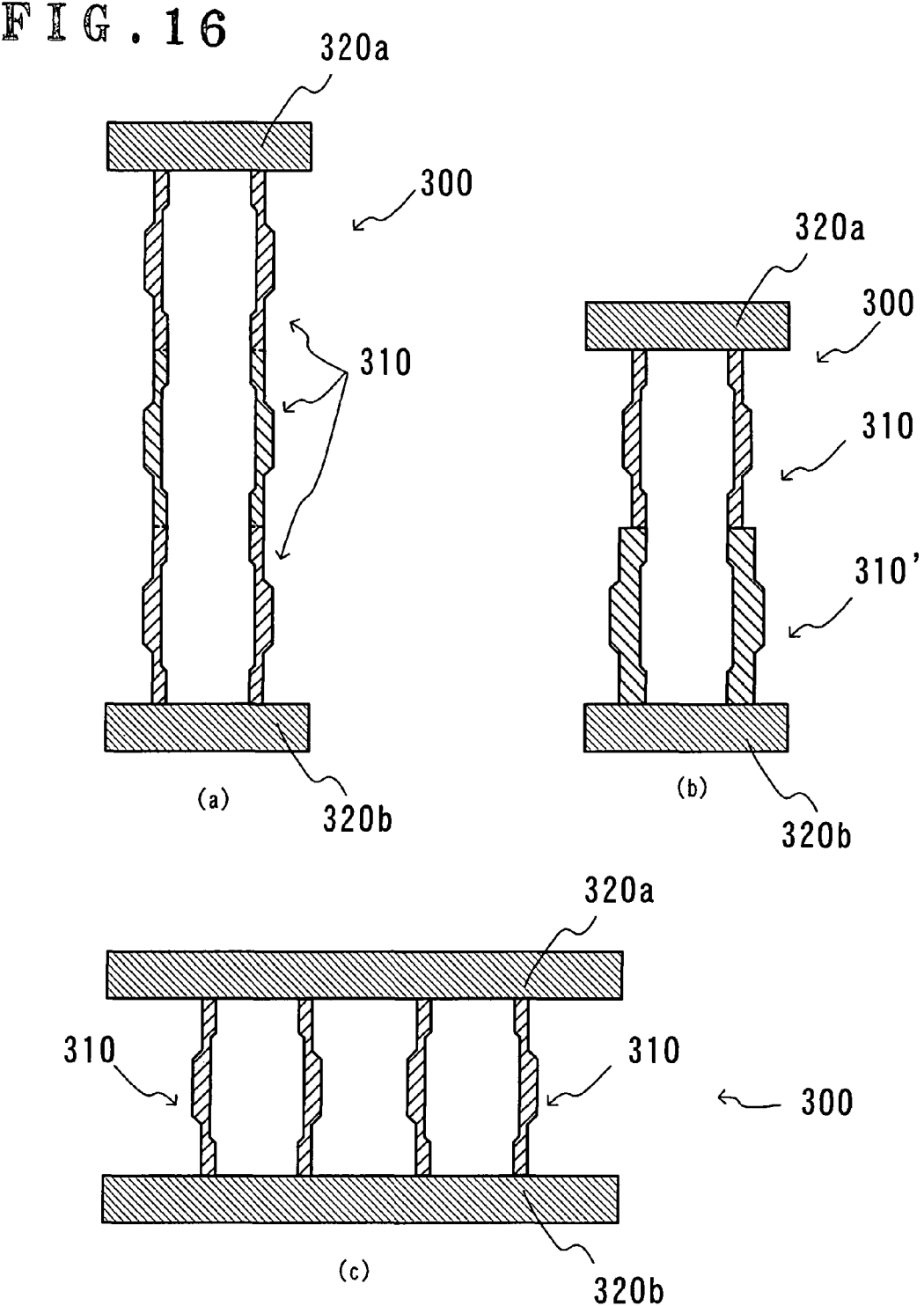
FIG. 16 shows cross-sectional views illustrating modifications of the third embodiment in which a plurality of the units 310 are used.

The impact absorber device 300 of the third embodiment has been described on the basis of one unit 310, but the present invention is not limited to this configuration. The impact absorber device 300 may include two or more units 310 which are stacked one on another. In this case, the units are integrated by being connected with each other by welding, for example. As mentioned above, the shearing stress in the radial direction can be substantially zero in both end faces of one unit, and therefore even if a plurality of units are stacked one on another, the deformation mode of each unit can be substantially equalized. FIG. 16A shows a modification where three units 310 are stacked vertically. These units may be formed to have different shapes and materials to each other. This arrangement makes it possible for different units to share different type of the impact. For example, two units may be stacked such that one unit serves weak impact energy and the other unit serves strong impact energy. FIG. 16B shows a modification where a unit 310 with a thin wall thickness and a unit 310' with a thick wall thickness are stacked one on another. When this device is installed in a vehicle, the safety of individuals on board can be widely guaranteed from collision at low speed to collision at high speed. Further, a plurality of units 310 may be arranged horizontally. FIG. 16C shows a modification where two units 310 are installed side by side. This arrangement makes it possible to disperse the impact load in absorbing the impact energy.

Accordingly, the impact absorber device 300 of the third embodiment of the present invention can absorb the impact energy in much more stable manner without generating an initial peak load, major change in load and fine waveform in each loop in the oscillation of the load, which are generated in the conventional impact absorber device during the impact absorption. This is because the present invention uses stable deformation phenomena such as expansion and shrink in a radial direction and compression, which simply increases the load as deformation progresses without using the buckling phenomena which causes sudden deformation when a load exceeds a threshold value. Further, deformation mode of the impact absorber device 300 of the third embodiment of the present invention is mainly attributed to the compression and expansion/shrink of the first portion 301 and second portion 302, and folding of each portion influenced by the connection portion 303, so that the deformation mode is more stable as compared with the buckling phenomena, which inherently has an unstable feature. Therefore it becomes possible to suppress change in deformation mode caused by slight deviation of dimension, installation condition and constraint condition which may occur during manufacturing and installation phases. Moreover, since the impact absorber device 300 of the third embodiment of the present invention absorbs the impact energy by uniformly deforming the entire first portion 301, second portion 302, and connection portion 303, and therefore energy absorption efficiency, that is the total amount of absorbed energy divided by unit weight of the impact absorber device 300, is higher than that of the conventional impact absorber device. FIG. 20 shows a table comparing the energy absorption efficiency of several impact absorber devices. The energy absorption efficiency of the third embodiment of the present invention achieves 62.1 KJ/kg, which is about 4.8 times as compared with a conventional impact absorber device. Further, since the structure of the impact absorber device 300 is simple, design features such as load peak and load-displacement relationship can be easily estimated, and the impact absorber device 300 can be easily manufactured with reduced cost. Moreover, since the impact absorber device of the present embodiment is integrally formed into one unit, the impact absorber device may cover various load displacements and may easily control various energy absorptions. Furthermore, since the impact absorber device of the present embodiment has no relative sliding portion between the expanding element and shrinking element owing to the integrally formed structure, which is necessary for the impact absorber device of the first embodiment, it becomes possible for the impact absorber device to provide highly rigid property and resistance property against bending, shearing, vibration, and so forth, and also it becomes easier for the impact absorber device to be installed at a necessary location. Further, as described above, the outer diameter of the first portion 301 hardly changes during the deformation. Therefore the unit 310 can be securely fixed to a designated installation location by merely fixing both ends thereof to the rigid plates, thereby making it possible for the impact absorber device to achieve specified performance even though the impact absorber device is subject to vibration, or the impact absorber device receives the impact in a diagonal direction.

The fourth embodiment of the present invention will be hereinafter described.

Figure 17:
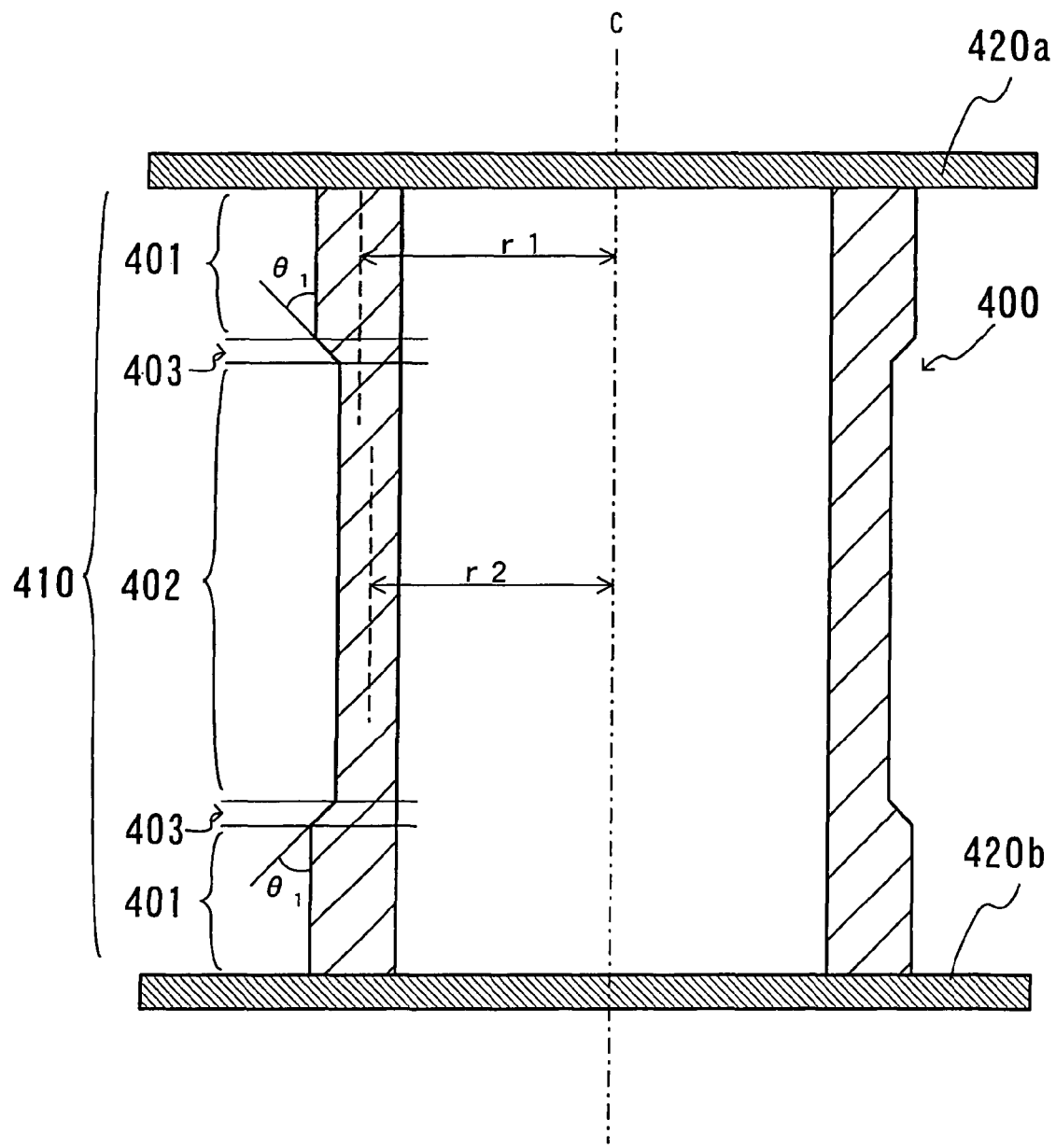
FIG. 17 is a cross-sectional view showing a fourth embodiment of an impact absorber device 400 according to the present invention.

FIG. 17 is a cross-sectional view of a fourth embodiment of an impact absorber device 400 according to the present invention.

The impact absorber device 400 of this embodiment includes a unit 410 which is integrally formed from two first portions 401 each having a short cylindrical shape, one second portion 402 having a short cylindrical shape, and two connection portions 403. Specifically, one second portion 402 is concentrically disposed between two first portions 401, and the connection portion 403 is provided between the first portion 401 and second portion 402. The inner diameter of the first portion 401 is the same as the inner diameter of the second portion 402, and the outer diameter of the first portion 401 is greater than the outer diameter of the second portion 402. The radius r1 of the cylinder of the first portion 401 measured on the basis of the center of its wall thickness is greater than the radius r2 of the cylinder of the second portion 402 measured on the basis of the center of the wall thickness. In order to form this arrangement, an inner diameter of the connection portion 403 is the same as the inner diameters of the first portion 401 and second portion 402, and the outer wall of the connection portion 403 is inclined at the inclination angle $\theta_1$ with respect to the concentric axis C of the unit 410. The inclination angle $\theta_1$ is 45°, for example. It should be noted that the angle $\theta_1$ is not limited to this value, but is determined to obtain an optimum value considering design parameters such as design impact load, specified extent of energy absorption, size of the impact absorber device and its material. The impact absorber device 400 is generally installed between rigid members such as rigid plates 420a and 420b as shown in FIG. 17.

The unit 410 of the impact absorber device 400 may be made of metal such as stainless, aluminum alloy and magnesium alloy, or nonmetal such as ceramic, plastic, and so forth. The impact absorber device 400 has, for example, the following dimensions: inner diameter, wall thickness and height of the first portion 401 are 21.2 mm, 7 mm and 6.8 mm, respectively, and inner diameter, wall thickness and height of the second portion 402 are 21.2 mm, 4 mm and 40 mm, respectively. The overall height of the unit is 60 mm. The impact absorber device 400 may have other dimensions on condition that each height of the first portion 401 and second portion 402 is shorter than the buckling wavelength ($\lambda$) thereof. With this arrangement, the first portion 401 and second portion 402 are compressed in the axial direction while maintaining the symmetrical deformation with respect to the central axis C without causing buckling deformation.

When the impact absorber device 400 receives an impact load in a central axis C direction, a compressing force to compress the first portion 401 in the axial direction and a shrinking force to shrink the first portion 401 in a radially inward direction are applied to the first portion 401 by the connection portion having an inclined portion. When a force applied to the first portion 401 exceeds a predetermined threshold, the first portion 401 causes plastic deformation, thereby absorbing the impact energy. On the other hand, a compressing force to compress the second portion 402 in the axial direction and an expanding force to expand the second portion 402 in a radially outward direction are applied to the second portion 402 by a connection portion having the inclined portion. When a force applied to the second portion 402 exceeds a predetermined threshold, the second portion 402 causes plastic deformation, thereby absorbing the impact energy.

Figure 18:
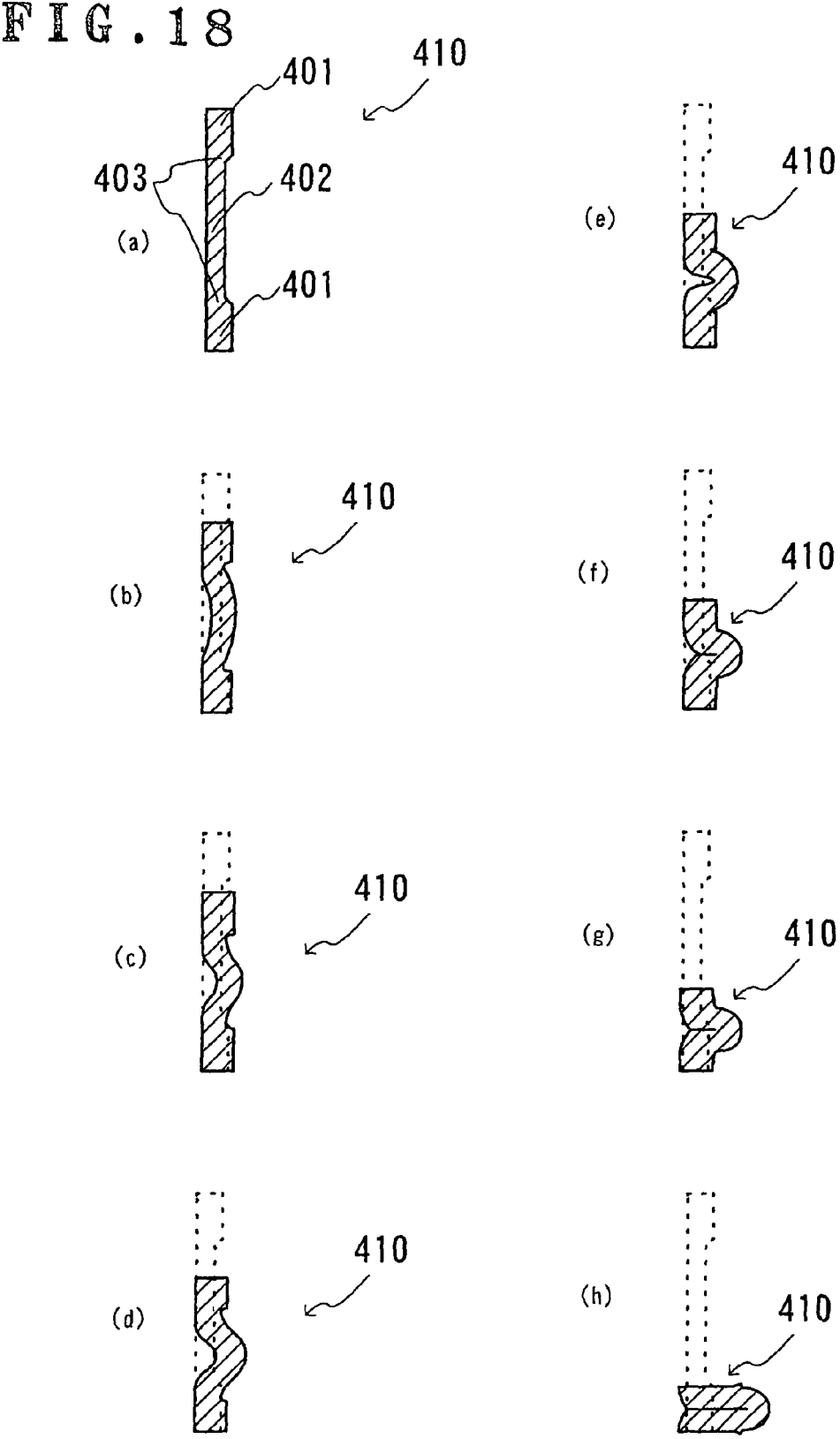
FIG. 18 shows partial cross-sectional views illustrating how the impact absorber device 400 of FIG. 17 deforms while absorbing impact energy.

The deformation of the first portion 401 and second portion 402 is not buckling deformation, but is expansion and shrink in a radial direction. FIG. 18A to FIG. 18H show a progress of this deformation. FIG. 18A to FIG. 18H show only one side in the cross-sectional view of one unit. In each cross-sectional view, an original shape of the unit before deformation is shown by a dotted line so as to visualize an extent of the deformation. FIG. 18A is a state before the impact load is applied to the impact absorber device 400. FIG. 18B to FIG. 18H show the progress of the deformation, and FIG. 18H shows the state when the deformation is completed. As understood from FIG. 18A to FIG. 18H, as deformation progresses, compression of the first portion 401 causes increase of the wall thickness and shrink of the first portion 401 in a radially inward direction. Simultaneously, compression of the second portion 402 causes increase of the wall thickness and expand of the second portion 402 in a radially outward direction. In addition, as the deformation progresses, the connection portion 403 is folded. It should be noted that, in the first portion 401, the outer diameter becomes somewhat larger as deformation progresses, but the inner diameter hardly changes. In this case, the shearing stress in the radial direction at both end faces of the unit is substantially zero. Accordingly, appropriately designed shape of the unit 410 makes it possible to control the deformation mode at both end faces of the unit. In the case shown in FIG. 18, for example, the change of inner diameter at both end faces of the unit is suppressed, so that the inner circumference portions at both ends of the impact absorber device 400 can be secured to the rigid plates 420 by securing means such as adhesive, welding and soldering, while substantially ensuring the impact absorption performance. Therefore when a plurality of units are used, as mentioned later, impact absorption performance is hardly interfered with even if adjustment units are completely integrated to each other. This means that when one impact absorber device is fabricated by connecting a plurality of units 410 by welding, the impact absorber device can be securely installed at an installation location by merely securing both ends to rigid bodies.

Figure 19:
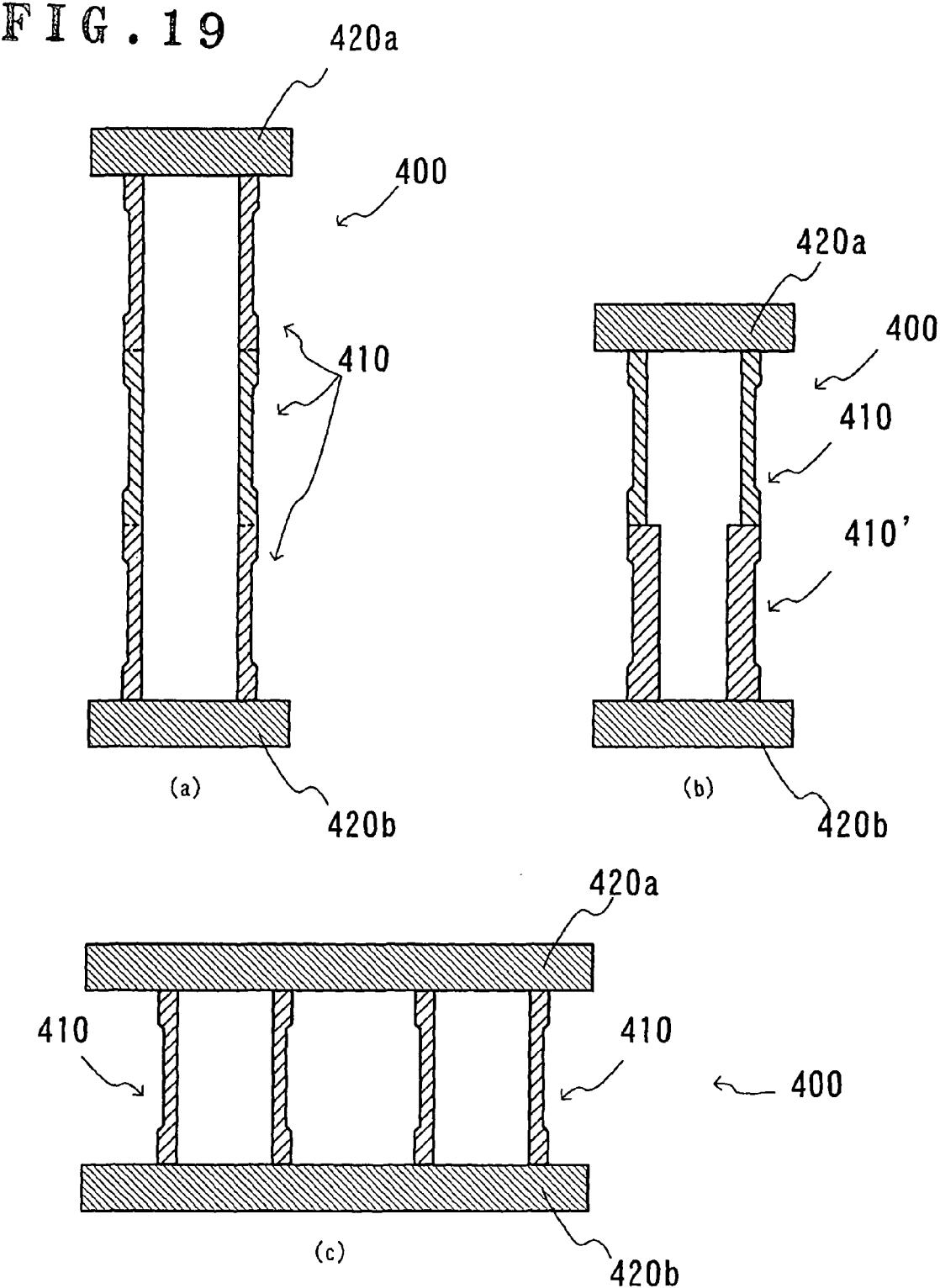
FIG. 19 shows cross-sectional views illustrating modifications of the fourth embodiment in which a plurality of the units 410 are used.

The impact absorber device 400 of the fourth embodiment has been described on the basis of one unit 410, but the present invention is not limited to this configuration. The impact absorber device 400 may include two or more units 410 which are stacked one on another. In this case, the units are integrated by being connected with each other by welding, for example. As mentioned above, the shearing stress in the radial direction can be substantially zero in both end faces of one unit, and therefore even if a plurality of units are stacked one on another, the deformation mode of each unit can be substantially equalized. FIG. 19A shows a modification where three units 410 are stacked vertically. These units may be formed to have different shapes and materials to each other. This arrangement makes it possible for different units to share different types of the impact. For example, two units may be stacked such that one unit serves weak impact energy and the other unit serves strong impact energy. FIG. 19B shows a modification where a unit 410 with a thin wall thickness and a unit 410' with a thick wall thickness are stacked one on another. When this device is installed in a vehicle, the safety of individual on board can be widely guaranteed from collision at low speed to collision at high speed. Further, a plurality of units 410 may be arranged horizontally. FIG. 19C shows a modification where two units 410 are installed side by side. This arrangement makes it possible to disperse the impact load in absorbing the impact energy.

Accordingly, the impact absorber device 400 of the fourth embodiment of the present invention can absorb the impact energy in much more stable manner without generating an initial peak load, major change in load and fine waveform in each loop in the oscillation of the load, which are generated in the conventional impact absorber device during the impact absorption. This is because the present invention uses stable deformation phenomena such as expansion/shrink in a radial direction and compression, which simply increases load as deformation progresses, without using the buckling phenomena which causes sudden deformation when a load exceeds a threshold value. Further, deformation mode of the impact absorber device 400 of the fourth embodiment of the present invention is mainly attributed to the compression and expansion/shrink of the first portion 401 and second portion 402, and folding of each portion influenced by the connection section 403, so that the deformation mode is more stable as compared with the buckling phenomena, which inherently has an unstable feature. Therefore it become possible to suppress change in deformation mode caused by slight deviation of dimension, installation condition and constraint condition which may occur during manufacturing and installation phases. Moreover, since the impact absorber device 400 of the fourth embodiment of the present invention absorbs the impact energy by uniformly deforming the entire first portion 401, second portion 402, and connection portion 403, and therefore energy absorption efficiency, that is the total amount of absorbed energy divided by unit weight of the impact absorber device, is higher than that of the conventional impact absorber device. FIG. 20 shows a table comparing the energy absorption efficiency of several impact absorber devices. The energy absorption efficiency of the fourth embodiment of the present invention achieves 57.7 KJ/kg, which is about 4.4 times as compared with the conventional impact absorber device. Since the structure of the impact absorber device 400 is simple, design features such as peak load and load-to-length-change relationship can be easily estimated, and the impact absorber device 400 can be easily manufactured with reduced cost. Moreover, since the impact absorber device of the present embodiment is integrally formed into one unit, the impact absorber device may cover various load displacements and may easily control various energy absorptions. Furthermore, since the impact absorber device 400 has no relative sliding portion between the expanding element and shrinking element owing to the integrally formed structure, which is necessary for the impact absorber device of the first embodiment, it becomes possible for the impact absorber device to provide highly rigid property and resistance property against bending, shearing, vibration, and so forth, and also it becomes easier for the impact absorber device to be installed at a necessary location. Further, in the impact absorber device 400 of the fourth embodiment, the inner diameters of the first portion 401 and second portion 402 and connection portion 403 are the same to each other, and therefore this device is suitable for manufacturing by casting, making it easy for manufacturing. Further, as described above, the inner diameter of the first portion 401 hardly changes during the deformation. Therefore the unit 410 can be securely fixed to a designated installation location by merely fixing both ends thereof to the rigid plates, thereby making it possible for the impact absorber device to achieve specified performance even though the impact absorber device is subject to vibration, or the impact absorber device receives the impact in a diagonal direction.

The invention claimed is:

1. An impact absorber device, comprising at least one first portion having a short tubular shape, and at least one second portion having a short tubular shape concentrically disposed in a stacked relationship with said first portion, wherein said first portion and said second portion engage with each other at an engagement portion which is inclined with respect to a concentric axis of said first portion and said second portion, wherein a stress to be applied to the impact absorber device in a direction of the concentric axis is divided into a force in a radius direction by the engagement portion of the first portion and the second portion, such that the first portion shrinks in a radially inward direction and the second portion expands in a radially outward direction, and wherein the engagement portion of the first portion and the second portion includes an inclined face of the first portion and an inclined face of the second portion which are abutted to each other, and at least one of the first portion and the second portion further comprises an additional inclined portion with an inclination angle different from the inclination angle of the inclined face at least one of a radially innermost portion and a radially outermost portion of the inclined face.

2. The impact absorber device according to claim 1, wherein the first portion and the second portion are compressed during their respective shrink and expand in a radial direction.

3. The impact absorber device according to claim 1, wherein on an arbitrary plane including the concentric axis, the inclined face of the first portion extends from a radially outermost portion to a radially innermost portion of the first portion so as to arrive at a hollow section in an inner diameter of the second portion.

4. The impact absorber device according to claim 1, wherein each of the first portion and the second portion has a short cylindrical shape of which cross-section is a circle, a short tubular shape of which cross-section is an ellipse, or a short tubular shape of which cross-section is a polygon.

5. The impact absorber device according to claim 1, wherein the impact absorber device has a plurality of the first portions of which shapes or materials are different from each other.

6. The impact absorber device according to claim 1, wherein the impact absorber device has a plurality of the second portions of which shapes or materials are different from each other.

7. The impact absorber device according to claim 1, wherein the inclination angle of the inclined face is within a range of 30° to 85°.

* * * * *